(12) United States Patent
Wada et al.

(10) Patent No.: US 10,892,456 B2
(45) Date of Patent: Jan. 12, 2021

(54) SEPARATOR FOR ELECTROCHEMICAL ELEMENT, ELECTROCHEMICAL ELEMENT, AUTOMOBILE, AND ELECTRONIC DEVICE

(71) Applicant: NIPPON KODOSHI CORPORATION, Kochi (JP)

(72) Inventors: Norihiro Wada, Kochi (JP); Atsushi Igawa, Kochi (JP); Masahiko Ueta, Kochi (JP)

(73) Assignee: NIPPON KODOSHI CORPORATION, Kochi (JP)

( * ) Notice: Subject to any disclaimer, the term of this patent is extended or adjusted under 35 U.S.C. 154(b) by 114 days.

(21) Appl. No.: 16/311,467

(22) PCT Filed: Jun. 27, 2016

(86) PCT No.: PCT/JP2016/068998
§ 371 (c)(1),
(2) Date: Dec. 19, 2018

(87) PCT Pub. No.: WO2018/002986
PCT Pub. Date: Jan. 4, 2018

(65) Prior Publication Data
US 2019/0355950 A1    Nov. 21, 2019

(51) Int. Cl.
*H01M 2/16* (2006.01)
*H01G 9/02* (2006.01)
*H01G 11/52* (2013.01)

(52) U.S. Cl.
CPC ............ *H01M 2/162* (2013.01); *H01G 9/02* (2013.01); *H01G 11/52* (2013.01)

(58) Field of Classification Search
CPC ............... H01M 2/162; H01M 10/052; H01M 2220/20; H01M 2/1626; H01M 2300/0025; H01M 2220/30; H01G 9/02; H01G 11/52

(Continued)

(56) References Cited

U.S. PATENT DOCUMENTS 5,942,354 A * 8/1999 Oxley ............ H01M 2/145
429/247
2009/0195964 A1    8/2009 Matsumura et al.

(Continued)

FOREIGN PATENT DOCUMENTS

EP    2602844 A1    6/2013
JP    2000-003834 A    1/2000

(Continued)

OTHER PUBLICATIONS

Sep. 20, 2016 International Search Report issued in Patent Application No. PCT/JP2016/068998.

(Continued)

*Primary Examiner* — Gary D Harris
(74) *Attorney, Agent, or Firm* — Oliff PLC

(57) ABSTRACT

A separator for an electrochemical element interposed between a pair of electrodes, capable of holding an organic electrolytic solution contains an electrolyte. The separator is a wet-laid nonwoven fabric containing 10-50 mass % of thermoplastic synthetic fibers and 50-90 mass % of beaten regenerated cellulose fibers having a mean fiber length of 0.2-2.0 mm, the separator has a thickness of 10-70 μm and a density of 0.25-0.90 g/cm3, including two parts obtained by bisecting a cross-section of the separator in a thickness direction. Two A-parts with a small number of the thermoplastic synthetic fibers and B-part with a large number of the thermoplastic synthetic fibers, and the A and B parts are (Continued)

formed into a single layer in an integrated manner; a value obtained by dividing the number of thermoplastic synthetic fibers in the A part by the number of the thermoplastic synthetic fibers in the B part is 0.85 or less.

8 Claims, 6 Drawing Sheets

(58) Field of Classification Search
USPC .......................................................... 429/249
See application file for complete search history.

(56) References Cited

U.S. PATENT DOCUMENTS

| | | |
|---|---|---|
| 2011/0206972 A1 | 8/2011 | Hashimoto et al. |
| 2013/0149614 A1 | 6/2013 | Kubo et al. |
| 2015/0010828 A1 | 1/2015 | Kubo et al. |
| 2017/0005311 A1 | 1/2017 | Hayakawa et al. |
| 2017/0133165 A1 | 5/2017 | Ichimura et al. |
| 2017/0294637 A1* | 10/2017 | Sato ..................... H01M 2/162 |

FOREIGN PATENT DOCUMENTS

| | | |
|---|---|---|
| JP | 2012-134097 A | 7/2012 |
| JP | 2013-157230 A | 8/2013 |
| JP | 2013-171905 A | 9/2013 |
| JP | 2015-060868 A | 3/2015 |
| JP | 2015-088703 A | 5/2015 |
| JP | 2016-025211 A | 2/2016 |
| JP | 5973052 B1 | 8/2016 |
| TW | 201211331 A | 3/2012 |
| WO | 2008/007500 A1 | 1/2008 |
| WO | 2012/008559 A1 | 1/2012 |
| WO | 2012/017954 A1 | 2/2012 |
| WO | 2015/146983 A1 | 10/2015 |

OTHER PUBLICATIONS

Feb. 25, 2020 Extended European Search Report issued in European Patent Application No. 16907219.6.

* cited by examiner

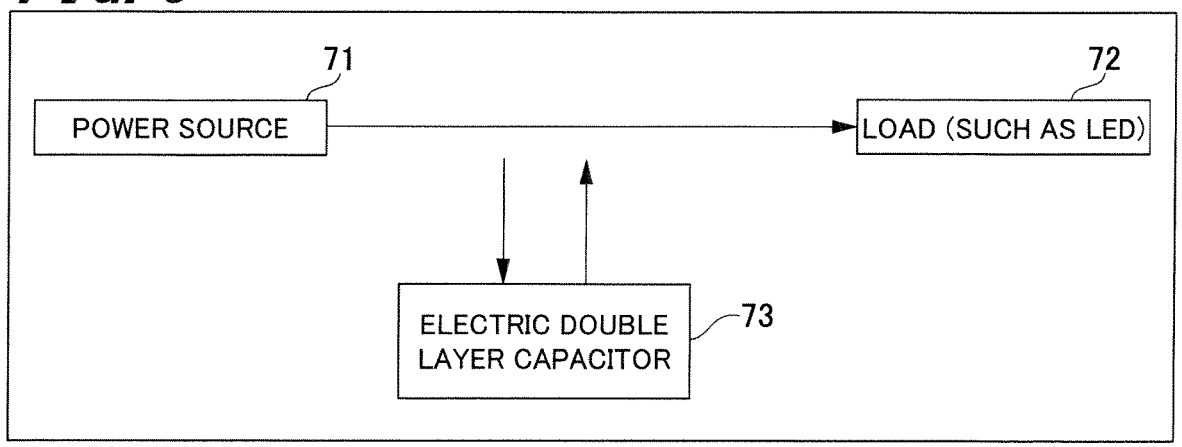
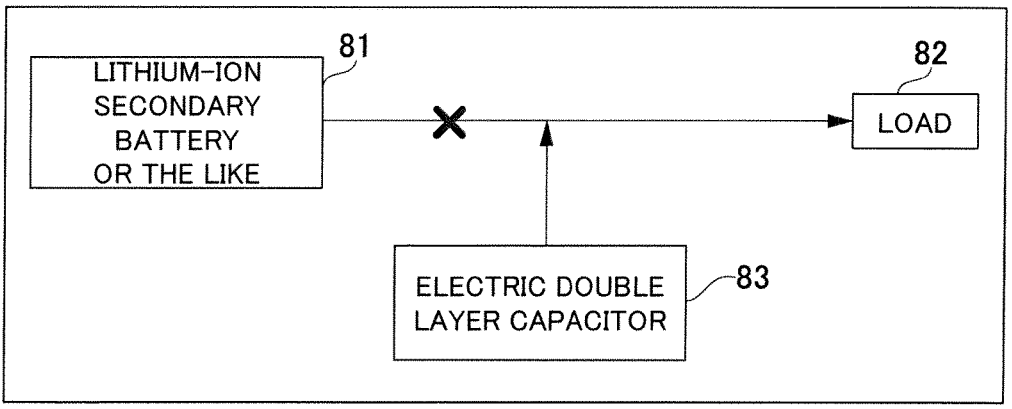

SEPARATOR FOR ELECTROCHEMICAL ELEMENT, ELECTROCHEMICAL ELEMENT, AUTOMOBILE, AND ELECTRONIC DEVICE

TECHNICAL FIELD

The present invention relates to a separator for an electrochemical element and to an electrochemical element that includes the separator. The present invention is suitable for application to, for example, separators for electrochemical elements such as aluminum electrolytic capacitors, electric double layer capacitors, lithium-ion capacitors, lithium primary batteries, and lithium-ion secondary batteries, and is suitable for application to these electrochemical elements. These electrochemical elements are suitable for application to automobiles and various electronic devices.

Background Art

Examples of the electrochemical elements include capacitors, supercapacitors, and batteries. In recent years, these electrochemical elements have been employed in various fields, for example, automobile-related equipment, renewable energy-related equipment such as wind generation and photovoltaic generation, and communication equipment such as smart meters, and the uses of such electrochemical elements are anticipated to expand in the future.

For example, in automobiles, lithium-ion secondary batteries or electric double layer capacitors are used for energy regeneration, and aluminum electrolytic capacitors or electric double layer capacitors are used as electronic control units (ECUs) for, for example, fuel injection, transmission, electronic throttle, and antilock brake system. In electric vehicles and hybrid vehicles which have received attention in recent years, lithium-ion secondary batteries are used as power sources, electric double layer capacitors are used for energy regeneration, and aluminum electrolytic capacitors are used as ECUs for motor control, battery control, HEV system control, and DC conversion from an external AC power source.

As described above, various electrochemical elements are mounted on the most important parts of automobiles that relate to running, braking, and rotating regardless of whether or not the automobiles include internal combustion engines.

Those electrochemical elements are required to have high reliability, since a short-circuit failure is immediately fatal to human life. In other words, those electrochemical elements are required to withstand vibrations of a vehicle body, not to cause a short-circuit failure even when used for a long period in a cold area or a high temperature area, and to have less performance deterioration.

In a circuit board used in an electronic device, there is an increasing demand for reduction in thickness and size of an electrochemical element that is mounted to the circuit board. Furthermore, an electrochemical element used for a power source of a portable device is required to have availability for a long time on a single charge.

Therefore, an electrochemical element such as an aluminum electrolytic capacitor mounted on a substrate is required to have a low height and a compact size for the purpose of smoothing supply of electric power to a chip or an CPU and smoothing an alternating current. Lithium-ion secondary batteries which are often used as power sources for portable devices are required to have not only a compact size and a thin thickness but also a high capacity so as to be available for a long time. In addition, such lithium-ion secondary batteries are required to have less performance deterioration even when charged and discharged over and over again.

Along with such expansion in applications and enhancement in performance of equipment to be used, electrochemical elements are required, more than ever, to have reliability that enables long-term use even in severe operating conditions and to improve in performance such as charge and discharge characteristics and output characteristic.

In an electrochemical element, a main role of a separator is to isolate a pair of electrodes and to hold an electrolytic solution. In order to isolate the pair of electrodes, the separator is required to have a low resistance and a high shielding performance. Along with the expansion in applications of electrochemical elements, separators are also required to improve in these performances.

A material of the separator is required to have an electrical insulation performance and also lyophilicity (affinity for electrolytic solutions) for holding various kinds of electrolytic solutions.

A material that satisfies those performances is cellulose. Treating (beating) cellulose fibers with a shear force makes the fibers finer, and forming a nonwoven fabric from the fine fibers yields a very dense sheet.

The fine cellulose fibers have a fiber length shorter than synthetic fibers or the like and are easy to fill voids in the sheet, which improves the shielding performance of the separator. Therefore, separators made of cellulose fibers with an excellent shielding performance are employed widely, contributing to reduction in short-circuit failures of electrochemical elements.

Recently, in addition to the shielding performance, reliability under severe operating conditions is gaining attention.

An electrochemical element is polarized in use. When anions gathered around an electrode, or a positive electrode, reacts with water in an electrolytic solution, or when the electrolytic solution decomposes, the electrolytic solution around the positive electrode shows strong acidity. Under severe operating conditions required in recent years, it becomes clear that this acid causes decomposition of a separator and causes a short-circuit of an electrochemical element.

As described above, there is a demand for a separator for an electrochemical element which not only improves a shielding performance to prevent short-circuit failures but also has a long-term stability and reliability even when used in severe operating conditions such as high temperature and high voltage.

Furthermore, in a separator for an electrochemical element, the electrochemical element is strongly required to have a smaller size, a larger capacity, and a larger current. In order to enhance those performances, the separator is also strongly required to have a smaller thickness and a lower resistance.

Various configurations have been proposed for a separator for an electrochemical element in order to improve characteristics such as a shielding performance (see, for example, Patent Literatures 1 to 6).

CITATION LIST

Patent Literature

Patent Literature 1: WO 2012/008559 A
Patent Literature 2: JP 2000-3834 A
Patent Literature 3: WO 2008/007500 A Patent Literature 4: JP 2015-60868 A
Patent Literature 5: JP 2013-171905 A
Patent Literature 6: JP 2012-134097 A

SUMMARY OF INVENTION

Technical Problem

Patent Literature 1 proposes a separator that includes synthetic fibers and solvent-spun cellulose fibers having controlled drainability and fiber length.

In the separator disclosed in Patent Literature 1, the beaten solvent-spun cellulose fibers and the synthetic fibers are homogeneously entwined with each other, causing an excellent strength in the separator.

However, in the separator disclosed in Patent Literature 1, in order to maintain the strength, it is necessary that the solvent-spun cellulose fibers have a length long enough to be entwined with the synthetic fibers, indicating that the solvent-spun cellulose fibers have low freeness (few short fibers). Therefore, the separator is not defined as having a high shielding performance, and when used as a separator, the separator may cause a short-circuit failure.

To improve the shielding performance of the separator disclosed in Patent Literature 1, if the solvent-spun cellulose fibers are further beaten, the solvent-spun cellulose fibers and the synthetic fibers are not entwined with each other anymore, and what is worse, the synthetic fibers hinder hydrogen bonds between the solvent-spun cellulose fibers, causing significant deterioration of strength of the separator.

Patent Literature 2 proposes a technique to improve denseness of a separator and to reduce a resistance thereof by beaten solvent-spun regenerated cellulose fibers. Beating the solvent-spun regenerated cellulose fibers which are to be beat yields fine fibrils of less than 1 μm. Therefore, the separator including the beaten solvent-spun regenerated cellulose is formed into a microporous sheet with high denseness, and compared with the separator disclosed in Patent Literature 1 or the like, the separator disclosed in Patent Literature 2 is a good separator having an excellent shielding performance.

However, along with the recent expansion in applications and enhancement in performances of electrochemical elements, separators are required to have even higher performances. Specifically, separators are required to withstand an acidic environment around a positive electrode when an electrochemical element is used.

A fluorine-containing electrolyte is widely used as an electrolytic solution of an electrochemical element. This electrolyte decomposes if an electrochemical element system contains water and causes hydrofluoric acid. Although an electrode material and a separator are used after being dried in advance (preliminarily dried), it is difficult to completely eliminate moisture, and the system may contain moisture.

According to the result of recent research efforts to increase a voltage of electrochemical elements, it becomes clear that when an electrochemical element is used at a high voltage, the electrochemical element is more polarized than at a normal voltage and acidity around a positive electrode increases, causing decomposition of cellulose.

For this reason, there is a growing demand for improvement in reliability such as physical and chemical stability so as to withstand long-term use even at a high voltage.

Patent Literature 3 proposes a separator that includes a cellulose-containing layer (separator layer) and a synthetic resin-containing layer that inhibits decomposition of cellulose (inhibit layer).

In Patent Literature 3, the inhibit layer is disposed on a positive electrode in order to achieve a long life of an electrochemical element.

However, superposing or gluing the two layers, the separator layer and the inhibit layer, increases the thickness of the separator as a whole, which leads to an increase in resistance and which may cause troubles due to detachment between the layers.

When the inhibit layer is applied to the separator layer after the separator layer is formed, the inhibit layer penetrates into the separator layer. Therefore, it is difficult to maintain the two-layer structure, and decomposition due to acid may not be prevented sufficiently.

It is also difficult to form the separator layer, in practice, by applying and drying a dispersion of cellulose fibers after the inhibit layer is formed. Cellulose includes hydroxyl groups, causing hydrogen bonds. However, resin recited in Patent Literature 3 for forming the inhibit layer does not form hydrogen bonds with cellulose to bind tightly with the cellulose. Therefore, even when the dispersion of the cellulose fibers is applied and dried on a surface of the inhibit layer, the dispersion easily peels off the surface.

Patent Literature 4 discloses a method for manufacturing a two-layer separator which includes fibrillated solvent-spun cellulose fibers and synthetic fibers and which has an improved surface strength.

In Patent Literature 4, at the time of manufacturing the separator, an amount of fibrillated solvent-spun cellulose fibers on the side to be brought into contact with a dryer is increased more than that on the side not in contact with the dryer. Accordingly, the surface strength of the separator improves, leading to reduction of a failure occurrence rate and an internal short-circuit occurrence rate at the time of manufacturing a capacitor.

However, since the side which is not in contact with the dryer and which contains a large amount of the synthetic fibers contains a small amount of the fibrillated solvent-spun cellulose fibers, a surface strength on this side is weak. Therefore, when the separator is conveyed at the time of manufacturing an electrochemical element, it is inevitable that the separator gets frayed from the side not in contact with the dryer. This is because the synthetic fibers on the side not in contact with the dryer are not fused. In order to improve the surface strength on the side not in contact with the dryer, if the synthetic fibers are heated enough to be fused, the sheet may shrink due to overdrying, which is a problem.

Furthermore, forming the separator into a two-layer separator increases the thickness of the entire separator, and it is difficult to cope with recent demands for a smaller size and higher performances of electrochemical elements. If the separator is made thin, each layer in the separator inevitably becomes thin, and it is difficult to sufficiently show characteristics of each layer, which impairs a shielding performance and a mechanical strength of the separator.

Patent Literature 5 proposes a separator of two-layer nonwoven fabric including a high-density layer and a low-density layer. In this separator, an amount of solvent-spun cellulose fibers in the high-density layer is larger than an amount of the solvent-spun cellulose fibers in the low-density layer.

In Patent Literature 5, the amount of the solvent-spun cellulose fibers in the high-density layer is increased to enhance denseness, while the amount of the solvent-spun cellulose fibers in the low-density layer is decreased to maintain a mechanical strength.

However, in the separator disclosed in Patent Literature 5, similarly to the separator disclosed in Patent Literature 4, forming the separator into a two-layer separator increases the thickness of the entire separator. If the separator is made thin, each layer in the separator inevitably becomes thin, and it is difficult to sufficiently show characteristics of each layer, which impairs a shielding performance and a mechanical strength of the separator.

Patent Literature 6 proposes a separator that includes splitting composite synthetic fibers and beaten solvent-spun cellulose fibers.

Patent Literature 6 discloses a technique to obtain a separator with an improved winding performance (mechanical strength) by splitting the splitting composite synthetic fibers containing polyester and polyethylene.

However, in a drying process at the time of manufacturing the separator, split fibers that contain polyethylene melt and fill voids in the separator, leading to an increase in resistance of the separator. If the separator is dried at a temperature at which polyethylene does not melt, intersections between the solvent-spun cellulose fibers and the split polyester-containing fibers are not adhered to each other due to polyethylene, causing significant deterioration of mechanical strength of the separator.

Although a separator made of a nonwoven fabric has been described above, there is also a separator for an electrochemical element that employs a synthetic resin microporous film. Such a separator is, typically, a film including polyolefin resin and having fine pores.

Compared with a separator made of a nonwoven fabric, such a film including polyolefin resin has a low holding power with respect to electrolytic solutions, which makes it difficult to prolong the life of the electrochemical element. Furthermore, such a film has a large resistance of the separator. Therefore, it is often the case that the electrochemical element increases in resistance. In addition, polyolefin resin has a heat resistance lower than cellulose or the like. Therefore, it is difficult to perform preliminary drying at high temperature and to improve productivity of electrochemical elements.

The present invention has been made in light of the above problems, and an object of the present invention is to provide a separator for an electrochemical element which not only improves a shielding performance of the separator to prevent short-circuit failures but also has reliability to withstand a high voltage of the electrochemical element, and to provide an electrochemical element including the separator. Another object of the present invention is to provide an automobile and an electronic device including a highly reliable electrochemical element.

Solution to Problem

To solve the aforementioned problems and to achieve the aforementioned objects, the present invention offers the following configuration.

In other words, a separator for an electrochemical element of the present invention is interposed between a pair of electrodes to isolate the electrodes and configured to hold an electrolytic solution that contains an electrolyte, in which the separator is a wet-laid nonwoven fabric which contains 10 to 50 mass % of thermoplastic synthetic fibers and 50 to 90 mass % of beaten regenerated cellulose fibers having a mean fiber length of 0.2 to 2.0 mm, and the separator has a thickness of 10 to 70 μm and a density of 0.25 to 0.90 $g/cm^3$, including two parts obtained by bisecting a cross-section of the separator in a thickness direction, in which the two parts are a part (A part) with a small number of the thermoplastic synthetic fibers and a part (B part) with a large number of the thermoplastic synthetic fibers, and the A part and the B part are formed into a single layer in an integrated manner, in which a value obtained by dividing the number of the thermoplastic synthetic fibers in the A part by the number of the thermoplastic synthetic fibers in the B part is 0.85 or less.

It is preferable that the thermoplastic synthetic fibers are one or more kinds of fibers selected from a polyester fiber, a polyolefin fiber, and an acrylic fiber.

An electrochemical element of the present invention includes the separator for an electrochemical element of the present invention.

Preferable examples of the electrochemical element of the present invention include an aluminum electrolytic capacitor, an electric double layer capacitor, a lithium-ion capacitor, a lithium-ion primary battery, and a lithium-ion secondary battery. In these electrochemical elements, it is preferable that the part (B part) in the separator with the large number of the thermoplastic synthetic fibers is disposed on a positive electrode.

An automobile of the present invention is equipped with the electrochemical element of the present invention.

Examples of the automobile of the present invention include electric vehicles and hybrid vehicles equipped with batteries, various automobiles equipped with electric double layer capacitors for energy regeneration, and various automobiles in which electronic control units (ECUs) for an electronic throttle, an antilock brake system, and the like are equipped with aluminum electrolytic capacitors or electric double layer capacitors.

An electronic device of the present invention is equipped with the electrochemical element of the present invention.

Examples of the electronic device of the present invention include various electronic devices equipped with batteries as power sources, and various electronic devices equipped with capacitors or supercapacitors.

Advantageous Effects of Invention

According to a separator for an electrochemical element of the present invention, it is possible to offer a separator which has a high shielding performance, mechanical strength, and chemical stability and which is effective for reducing short-circuit failures.

An electrochemical element of the present invention includes the separator for an electrochemical element of the present invention, so that it is possible to reduce a short-circuit failure rate and to increase a voltage of the electrochemical element.

Furthermore, it is possible to improve safeness of an automobile that includes the electrochemical element of the present invention, and to downsize and extend lifetime of an electronic device that includes the electrochemical element of the present invention.

BRIEF DESCRIPTION OF DRAWINGS

FIG. 6 is a block diagram of an electronic device according to an embodiment of the present invention.

FIG. 7 is a block diagram of an electronic device according to another embodiment of the present invention.

DESCRIPTION OF EMBODIMENTS

Figure 1:
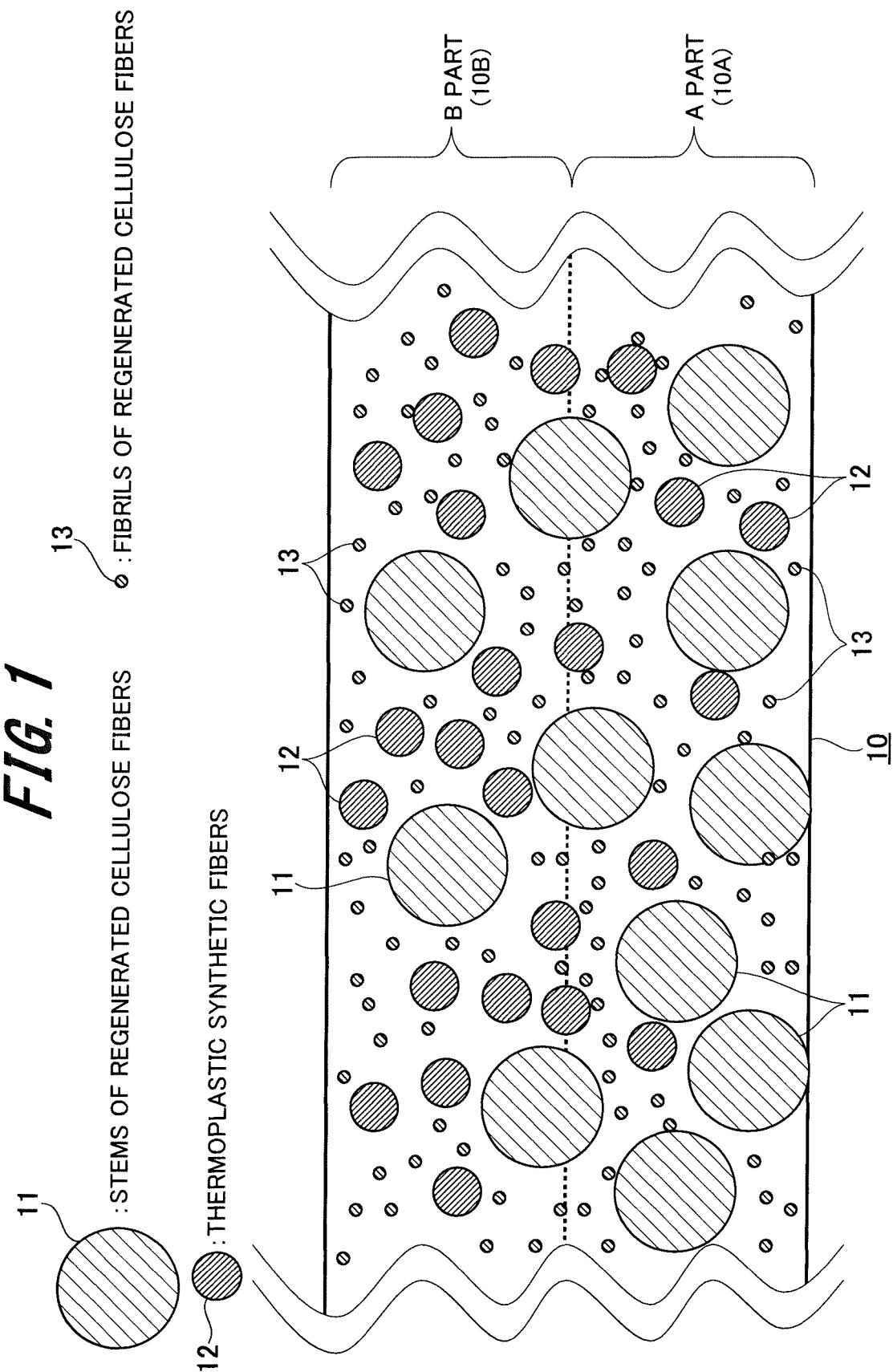
FIG. 1 is a schematic cross-sectional view of a separator for an electrochemical element according to an embodiment of the present invention.

A separator for an electrochemical element of the present invention is interposed between a pair of electrodes to isolate the electrodes and configured to hold an electrolytic solution that contains an electrolyte, in which the separator is a wet-laid nonwoven fabric which contains 10 to 50 mass % of thermoplastic synthetic fibers and 50 to 90 mass % of beaten regenerated cellulose fibers having a mean fiber length of 0.2 to 2.0 mm, and the separator has a thickness of 10 to 70 μm and a density of 0.25 to 0.90 g/cm$^3$, including two parts obtained by bisecting a cross-section of the separator in a thickness direction, in which the two parts are a part (A part) with a small number of the thermoplastic synthetic fibers and a part (B part) with a large number of the thermoplastic synthetic fibers, and the A part and the B part are formed into a single layer in an integrated manner, in which a value obtained by dividing the number of the thermoplastic synthetic fibers in the A part by the number of the thermoplastic synthetic fibers in the B part is 0.85 or less.

In other words, the separator for an electrochemical element of the present invention is a sheet formed into a single layer in an integrated manner. When a cross-section of the separator is bisected in a thickness direction, the thermoplastic synthetic fibers and the beaten regenerated cellulose fibers are observed to be unevenly distributed in upper and lower parts: the part (A part) with the small number of the thermoplastic synthetic fibers and the part (B part) with the large number of the thermoplastic synthetic fibers. When a value (A/B value) obtained by dividing the number of the thermoplastic synthetic fibers in the A part by the number of the thermoplastic synthetic fibers in the B part is 0.85 or less, each fiber in the A part and the B part is unevenly distributed, which is an essential structure in the present invention.

An electrochemical element of the present invention is one that includes, as a separator, the separator for an electrochemical element of the present invention which has the above configuration and which is interposed between a pair of electrodes.

In other words, the electrochemical element of the present invention is formed by impregnating and holding the separator for an electrochemical element of the present invention with an electrolytic solution and by isolating both electrodes with the separator.

An automobile of the present invention is equipped with the electrochemical element of the present invention. The automobile of the present invention is applicable to any of an engine vehicle, an electric vehicle, and a hybrid vehicle.

Examples of the automobile of the present invention include electric vehicles and hybrid vehicles equipped with batteries, various automobiles equipped with electric double layer capacitors for energy regeneration, and various automobiles in which electronic control units (ECUs) for an electronic throttle, an antilock brake system, and the like are equipped with aluminum electrolytic capacitors or electric double layer capacitors.

An electronic device of the present invention is equipped with the electrochemical element of the present invention.

Examples of the electronic device of the present invention include various electronic devices equipped with batteries as power sources, and various electronic devices equipped with capacitors or supercapacitors.

Among various kinds of thermoplastic synthetic resin, from viewpoints of acid resistance, heat resistance, and suitability for papermaking, thermoplastic synthetic fibers usable in the separator of the present invention are preferably polyester fibers such as polyethylene terephthalate, polyolefin fibers such as polyethylene and polypropylene, and acrylic fibers such as polyacrylonitrile. Among those thermoplastic synthetic fibers, polyester fibers are more preferable from viewpoints of heat resistance and acid resistance.

A method of forming a separator into a layer using a difference in specific gravity between thermoplastic synthetic resin and cellulose is simple, which is to be described later in detail. Therefore, it is preferable that the thermoplastic synthetic resin has a specific gravity smaller than that of the cellulose. Specifically, the specific gravity is preferably 1.45 or less.

Examples of the regenerated cellulose fibers usable for the separator of the present invention include solvent-spun rayon typified by lyocell and polynosic rayon. However, the present invention is not limited to these examples and may employ any regenerated cellulose fibers which are to be beat.

Examples of the electrochemical element of the present invention includes an aluminum electrolytic capacitor, an electric double layer capacitor, a lithium-ion capacitor, a lithium-ion secondary battery, and a lithium primary battery. These electrochemical elements may include the separator for an electrochemical element of the present invention to fabricate the electrochemical element of the present invention.

The electrolytic solution used in the electrochemical element of the present invention is not limited to a combination of a solvent and an electrolyte described in the after-mentioned Examples and may employ any electrolyte that is commonly used.

A material of the electrodes in the electrochemical element of the present invention is not limited to a combination described in the after-mentioned Examples and may employ any electrode material for electrochemical elements that is commonly used.

In the separator for an electrochemical element of the present invention, the A part forms a very dense layer containing a large number of the beaten regenerated cellulose fibers. Accordingly, compared with a separator as one disclosed in Patent Literature 1 in which cellulose fibers and synthetic fibers are homogeneously mixed with each other, it is possible to improve a shielding performance.

Therefore, in an electrochemical element including the separator for an electrochemical element of the present invention, a short-circuit failure rate is reduced.

In the separator for an electrochemical element of the present invention, the B part has a larger number of the thermoplastic synthetic fibers than the A part. For this reason, the B part contains many thermoplastic synthetic fibers entwined with each other, and intersections between those thermoplastic synthetic fibers are fused and compressively bonded by heating and compression in a manufacturing process of the separator. Therefore, the separator for an electrochemical element of the present invention greatly improves in mechanical strength as compared with a separator in which the strength is improved by entanglement of homogeneously mixed synthetic fibers and cellulose fibers, as one disclosed in Patent Literature 1.

The separator for an electrochemical element of the present invention offers the above effects at the same time, so that even though an amount of the synthetic fibers in the separator is smaller than an amount used in the related art, the strength is sufficiently improved. Reduction in amount of the synthetic fibers leads to an increase in amount of the regenerated cellulose fibers. Accordingly, it is possible to further improve the shielding performance.

Furthermore, in the separator of the present invention in which the A part and the B part are formed into a single layer in an integrated manner, even though the separator is made thinner, the separator is maintained to have a shielding performance higher than that in a separator in which two layers are separately formed and then superposed or glued together, as separators disclosed in Patent Literatures 4 and 5.

The A part and the B part contain both the regenerated cellulose fibers and the thermoplastic synthetic fibers, in different proportions, and are formed into a single layer in an integrated manner. Therefore, the separator of the present invention includes the regenerated cellulose fibers intertwined with each other, the thermoplastic synthetic fibers intertwined with each other, and the regenerated cellulose fibers and the thermoplastic synthetic fibers intertwined with each other. The fusion and compressive bonding between the thermoplastic synthetic fibers improves the mechanical strength of the separator, and the entanglement between the regenerated cellulose fibers improves the shielding performance of the separator. In addition, the thermoplastic synthetic fibers and the regenerated cellulose fibers are also entwined with each other. Therefore, the separator of the present invention has no fear of detachment between those fibers.

A separator with a A/B value of 0.85 or less is one that has the structure according to the present invention. Therefore, this separator improves in shielding performance and mechanical strength. A separator having an A/B value of 0.75 or less is preferable in that fibers are distributed more unevenly. A separator having an A/B value of 0.6 or less is more preferable in that fibers are distributed even more unevenly.

A separator having an A/B value over 0.85 includes thermoplastic synthetic fibers and regenerated cellulose fibers homogenously entwined with each other, which reduces entanglement between the thermoplastic fibers and entanglement between the regenerated cellulose fibers. Therefore, such a separator does not improve in mechanical strength and shielding performance.

In regard to the regenerated cellulose fibers, it is preferable that the fibers are distributed unevenly in such a manner that the number of stems of regenerated cellulose fibers in the A part is large and the number of stems of regenerated cellulose fibers in the B part is small.

In a case where a value (B/A value) obtained by dividing the number of the stems of regenerated cellulose fibers in the B part by the number of the stems of regenerated cellulose fibers in the A part is 0.85 or less, that is, when the regenerated cellulose fibers are unevenly distributed in the opposite pattern to the uneven distribution of the thermoplastic synthetic fibers, it is possible to maximize denseness which is a character of the beaten regenerated cellulose fibers.

Furthermore, in the separator for an electrochemical element of the present invention, the B part in the separator is disposed on a positive electrode of the electrochemical element. Accordingly, the separator is able to withstand acidic conditions generated around the positive electrode when the electrochemical element is used. Therefore, the separator of the present invention contributes to an increase in voltage of various electrochemical elements, which is an increasing demand in market in recent years.

Among various electrochemical elements, supercapacitors and capacitors do not distinguish between two electrodes, a positive electrode and a negative electrode, in operating principle. However, in an actual product, a positive electrode and a negative electrode are distinguished. In a case where the separator for an electrochemical element of the present invention is applied to a product such as a supercapacitor and a capacitor, it is preferable that the B part in the separator is disposed on a positive electrode of the supercapacitor or the capacitor.

When a separator including regenerated cellulose fibers is immersed in an electrolytic solution, generally, the electrolytic solution penetrates between the fibers. Accordingly, a strength of the separator is deteriorated as compared with a state when the separator is dried.

In contrast, the separator of the present invention does not cause such deterioration of strength. Therefore, the separator of the present invention also contributes to improvement in vibration resistance of an electrochemical element that includes the separator of the present invention.

Furthermore, since the separator of the present invention has an excellent shielding performance, even with a smaller thickness or lower density than in an ordinarily used separator, the separator of the present invention has a sufficient shielding performance. Therefore, with the separator of the present invention, it is possible to reduce short-circuit failures and to improve long-term reliability of the electrochemical element. The separator of the present invention also enables reductions in resistance and size.

Being provided with the separator of the present invention, the electrochemical element of the present invention simultaneously satisfies the requirement such as compact size, high capacity, high output, and long-term availability which are required for automobiles and various electronic devices.

Accordingly, the electrochemical element of the present invention contributes to improvement of safeness and reliability of an automobile that includes the electrochemical element of the present invention, and contributes to downsizing, lifetime extension, and reliability improvement of an electronic device that includes the electrochemical element of the present invention.

The fibers in the separator for an electrochemical element of the present invention are distributed unevenly, and such a structure is fabricated by, for example, the following method.

Highly beaten regenerated cellulose fibers and thermoplastic synthetic fibers are mixed and dispersed in water, and the resultant is filtrated from a net surface by a papermaking method, whereby forming a sheet. In other words, a wet-laid nonwoven fabric is prepared.

Cellulose fibers have a specific gravity of about 1.5. On the other hand, synthetic fibers have a specific gravity smaller than 1.5, depending on the type of resin.

Therefore, processes of mixing these fibers and making a sheet by gentle filtration yield a sheet having a structure of unevenly distributed fibers in which the cellulose fibers are deposited on the lower part of the sheet and the synthetic fibers are deposited on the upper part of the sheet. In the following exemplary embodiment of the present invention, a sheet with unevenly distributed fibers is formed, utilizing a difference in specific gravity.

Note that the present invention may employ any separator as long as the separator is formed into a single layer in an integrated manner and has a structure in which regenerated cellulose fibers and synthetic resin fibers are distributed unevenly. Furthermore, note that the present invention is not limited to a separator formed by a specific papermaking method which is illustrated in the exemplary embodiment of the present invention.

Specifically, the separator of the present invention is obtained, for example, by the following method.

First, beaten regenerated cellulose fibers are used as regenerated cellulose fibers. Beating the regenerated cellulose fibers causes fine fibrils branched from the fibers like a tree. Further beating the fibrils not only increases the branches but also causes the fibrils to drop off the fibers.

In a papermaking process, the beaten regenerated cellulose fibers and the thermoplastic synthetic fibers are mixed and dispersed in a large amount of water to obtain a dispersion, and then, the dispersion is filtered with a wire (papermaking net), whereby forming a sheet. When this dispersion is supplied onto the wire, first, fibers that have a large filtration resistance, a high specific gravity, and a thick diameter (stems of fibers) are deposited on the wire. Then, fine fibrils are gradually deposited on a layer of the deposited stems of fibers.

The layer which is formed by the stem of beaten regenerated cellulose fibers and which is deposited first is finer than a wire commonly used in papermaking machines. Therefore, even though the fibrils deposited on the layer of the deposited stems are extremely fine, it is possible to prevent the fibrils from dropping off (slipping through) the wire.

Even in a case where the synthetic fibers and the beaten regenerated cellulose fibers are simultaneously supplied onto the wire, similarly to the aforementioned process, the stems of regenerated cellulose fibers are deposited first on the wire due to a difference in specific gravity between the cellulose and the synthetic fibers.

Synthetic fibers do not cause hydrogen bonds. Therefore, a nonwoven fabric including beaten regenerated cellulose may be reduced in density and may be deteriorated in denseness. However, in the separator of the present invention, the fibrils dropping off the stems fill voids in the separator so as to be stable. Accordingly, the separator of the present invention is not deteriorated in denseness.

In other words, the freeness of the regenerated cellulose fibers requires balance to such an extent that the stems and the fibrils coexist.

Heating and compressing the sheet (wet-laid nonwoven fabric) having the structure of unevenly distributed fibers, the thermoplastic synthetic fibers in the A part are fused and compressively bonded to each other, which leads to great improvement in strength of the separator.

Generally, when a separator including regenerated cellulose is immersed in an electrolytic solution, the electrolytic solution penetrates between the fibers, causing deterioration of strength as compared with a state where the separator is dried. However, the separator of the present invention which includes the synthetic fibers fused and compressively bonded to each other does not cause deterioration of strength due to immersion in the electrolytic solution. Therefore, it is possible to improve a vibration resistance when the separator of the present invention is applied to an electrochemical element.

As a method of forming a wet-laid nonwoven fabric, the present invention is not limited to a specific technique and may employ any technique that has been selected in the related art.

Generally, for example, Fourdrinier paper machines, cylinder paper machines, and Tanmo paper machines are widely used.

Among these paper machines, Tanmo paper machines or Fourdrinier paper machines are preferable to achieve the configuration of the present invention, because in those machines, a filtration time from supply of raw slurry onto a papermaking wire to formation of a sheet is comparatively long, and a direction of filtration is vertical.

In the papermaking process for the separator of the present invention, additives commonly used in the papermaking process such as dispersants, antifoaming agents, and paper strengthening agents may be used as needed. Furthermore, a paper strengthening agent that includes polyacrylamide or the like may be applied to the separator as needed.

In the present invention, a fiber length according to JIS P8226-2 is used as a mean fiber length of the beaten regenerated cellulose fibers.

When beating the fibers which are to be beaten, the mean fiber length is gradually reduced. When the mean fiber length is in a range of 0.2 to 2.0 mm, the A/B value and the B/A value are set to preferable values.

When the mean fiber length exceeds 2.0 mm, the fibrils are not sufficiently generated, which makes it difficult to improve the shielding performance. Furthermore, long fibers that are not sufficiently made fine are entwined with the thermoplastic synthetic fibers and deposited on the wire together with the thermoplastic synthetic fibers. Such a condition makes it difficult to decrease the A/B value and B/A value.

When the mean fiber length is less than 0.2 mm, the fibers are too fine, and the number of the stems is too small. Such a condition accelerates the fibers from dropping off the wire and makes it difficult to decrease the A/B value and the B/A value.

It is preferable that the mean fiber length is 0.4 to 1.0 mm, because in that case, the A/B value is easily set to 0.75 or less, and more preferably, the mean fiber length is 0.5 to 1.0 mm, because in that case, the A/B value is easily set to 0.6 or less.

Controlling the freeness of the regenerated cellulose fibers offers a mean fiber length within the aforementioned range. As for the freeness of the regenerated cellulose fibers, the drainability (CSF value) according to JIS P 8121-2 is used. When beating the fibers which are to be beaten, the CSF value gradually decreases and reaches the lower limit. Herein, when the fibers are further beaten, the CSF value starts to increase.

This CSF value is important in order to achieve the A/B value and the B/A value of the present invention. The freeness of the regenerated cellulose of the present invention is preferably 100 ml or less in terms of a CSF value on the decreasing side and is preferably 700 ml or less in the terms of a CSF value on the increasing side.

When the CSF value on the decreasing side is larger than 100 ml, it is difficult to reduce the mean fiber length to 2 mm or less. When the CSF value on the increasing side further increases and exceeds 700 ml, it is difficult to increase the mean fiber length to 0.2 mm or more.

In regard to equipment that is used for beating the regenerated cellulose fibers included in the separator of the present invention, any equipment may be employed as long as it is used for preparing ordinary papermaking raw materials. Typical examples of the equipment include beater, conical refiner, disc refiner, and high pressure homogenizer.

In the separator of the present invention, it is preferable that the thermoplastic synthetic fibers have a small fiber diameter.

In the same specific gravity, synthetic fibers with a small fiber diameter slowly precipitate in water as compared with synthetic fibers having a large fiber diameter. Therefore, it is possible to form a sheet with fibers distributed more unevenly. The thinner the fiber diameter, the denser the sheet is made. Accordingly, the shielding performance of the separator improves.

For the above reasons, it is preferable that synthetic fibers have a fiber diameter of 0.5 to 10 μm.

A fiber diameter of less than 0.5 μm makes it difficult to uniformly disperse the fibers in water, which is not preferable.

In regard to the structure of unevenly distributed fibers in the separator of the present invention formed into a single layer in an integrated manner, the A part and the B part are not necessarily separated in such a manner that both parts include one type of fiber. The separator of the present invention may have a structure in which a proportion of the fibers gradually changes from one surface to the other.

A proportion of the regenerated cellulose fibers to the entire separator of the present invention is preferably 50 to 90 mass %, and a proportion of the synthetic fibers to the entire separator of the present invention is preferably 10 to 50 mass %.

When the amount of the regenerated cellulose fibers exceeds 90 mass %, that is, when the amount of the synthetic fibers is less than 10 mass %, the separator may not expect to have an improved strength.

Furthermore, when the amount of the synthetic fibers exceeds 50 mass %, that is, when the amount of the regenerated cellulose fibers is less than 50 mass %, the separator may not expect to have an improved shielding performance.

The separator of the present invention preferably has a thickness of 10 to 70 μm and a density of 0.25 to 0.90 g/cm$^3$. Calendaring may be carried out, as needed, in order to control the separator to have a desired thickness and density.

A thickness of less than 10 μm or a density of less than 0.25 g/cm$^3$ deteriorates the mechanical strength of the separator. Deterioration of mechanical strength easily causes fracture of the separator during the manufacturing process of the separator or the manufacturing process of the electrochemical element, and makes it difficult to prevent short-circuit failures of the electrochemical element. A thickness of over 70 μm or a density of over 0.90 g/cm$^3$ leads to an increase in resistance of the separator.

Hereinafter described is a specific embodiment according to the present invention.

FIG. 1 shows a schematic cross-sectional view of a separator for an electrochemical element according to an embodiment of the present invention.

A separator for an electrochemical element 10 shown in FIG. 1 includes regenerated cellulose fibers and thermoplastic synthetic fibers inside a sheet-shaped separator that is formed into a single layer in an integrated manner. These fibers are roughly classified into three groups: stems of regenerated cellulose fibers 11, thermoplastic synthetic fibers 12, and fibrils of regenerated cellulose fibers 13 in order of decreasing fiber diameter.

In FIG. 1, the cross-section of the separator for an electrochemical element 10 is bisected in a thickness direction and divided into a lower half A part 10A and an upper half B part 10B. The boundary line between those parts is indicated by a dotted line.

The lower half A part 10A contains a small number of the thermoplastic synthetic fibers 12 and a large number of the stems of regenerated cellulose fibers 11.

The upper half B part 10B contains a large number of the thermoplastic synthetic fibers 12 and a small number of the stems of regenerated cellulose fibers 11.

In the electrochemical separator 10 according to this embodiment, the value (A/B value) obtained by dividing the number of the thermoplastic synthetic fibers 12 in the A part 10A by the number of the thermoplastic synthetic fibers 12 in the B part 10B is 0.85 or less. The A/B value is preferably 0.75 or less, and more preferably, 0.6 or less.

Furthermore, it is preferable that the value (B/A value) obtained by dividing the number of the stems of regenerated cellulose fibers 11 in the B part 10B by the number of the stems of regenerated cellulose fibers 11 in the A part 10A is 0.85 or less.

Figure 2:
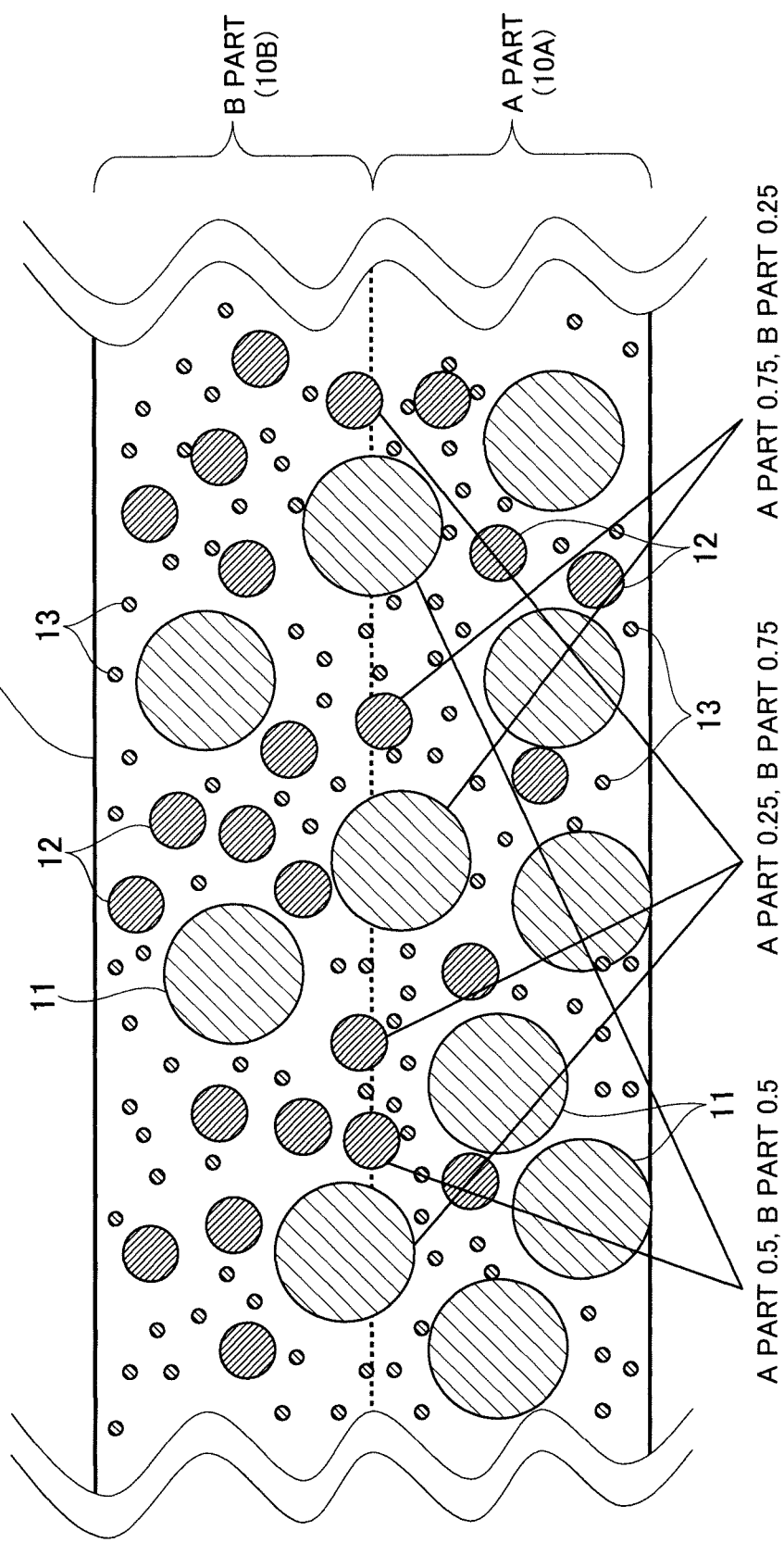
FIG. 2 is a view for explaining how to count the number of fibers in the configuration of FIG. 1.

With reference to FIG. 2, hereinafter described is a method of calculating the number of the thermoplastic synthetic fibers 12 and the number of the stems of regenerated cellulose 11 in the cross-section of the separator for an electrochemical element 10.

In FIG. 2, the stems of regenerated cellulose fibers 11, the thermoplastic synthetic fibers 12, and the fibrils of regenerated cellulose fibers 13 in the cross-section of the separator for an electrochemical element 10 are arranged equal to those in FIG. 1.

In FIG. 2, a fiber which does not cross the center line and is present in the A part 10A or in the B part 10B is counted as one fiber.

On the other hand, the number of fibers crossing the center line is counted as shown in FIG. 2.

A fiber eccentrically located in the A part 10A is counted as 0.75 in the A part and 0.25 in the B part.

A fiber uniformly contained in the A part 10A and the B part 10B is counted as 0.5 in the A part and 0.5 in the B part.

A fiber eccentrically located in the B part 10B is counted as 0.25 in the A part and 0.75 in the B part.

In this manner, the number of fibers in each of the A part 10A and the B part 10B of the cross-section of the separator for an electrochemical element 10 is counted.

In FIG. 2, the number of the thermoplastic synthetic fibers 12 is 7.75 in the A part 10A and 16.25 in the B part, while the number of the stems of regenerated cellulose fibers 11 is 7.5 in the A part and 3.5 in the B part. Therefore, the A/B value of the thermoplastic synthetic fibers 12 is 7.75/16.25=0.48, and the B/A value of the stems of regenerated cellulose fibers 11 is 3.5/7.5=0.47. Herein, the A/B value of the thermoplastic synthetic fibers 12 and the B/A value of the stems of regenerated cellulose fibers 11 are both 0.85 or less, which sufficiently provides the effects of the separator for an electrochemical element of the present invention.

Hereinafter described is several embodiments of the automobile of the present invention, that is, the electrochemical element of the present invention (the electrochemical element including the separator of the present invention) applied to an automobile.

Figure 3:
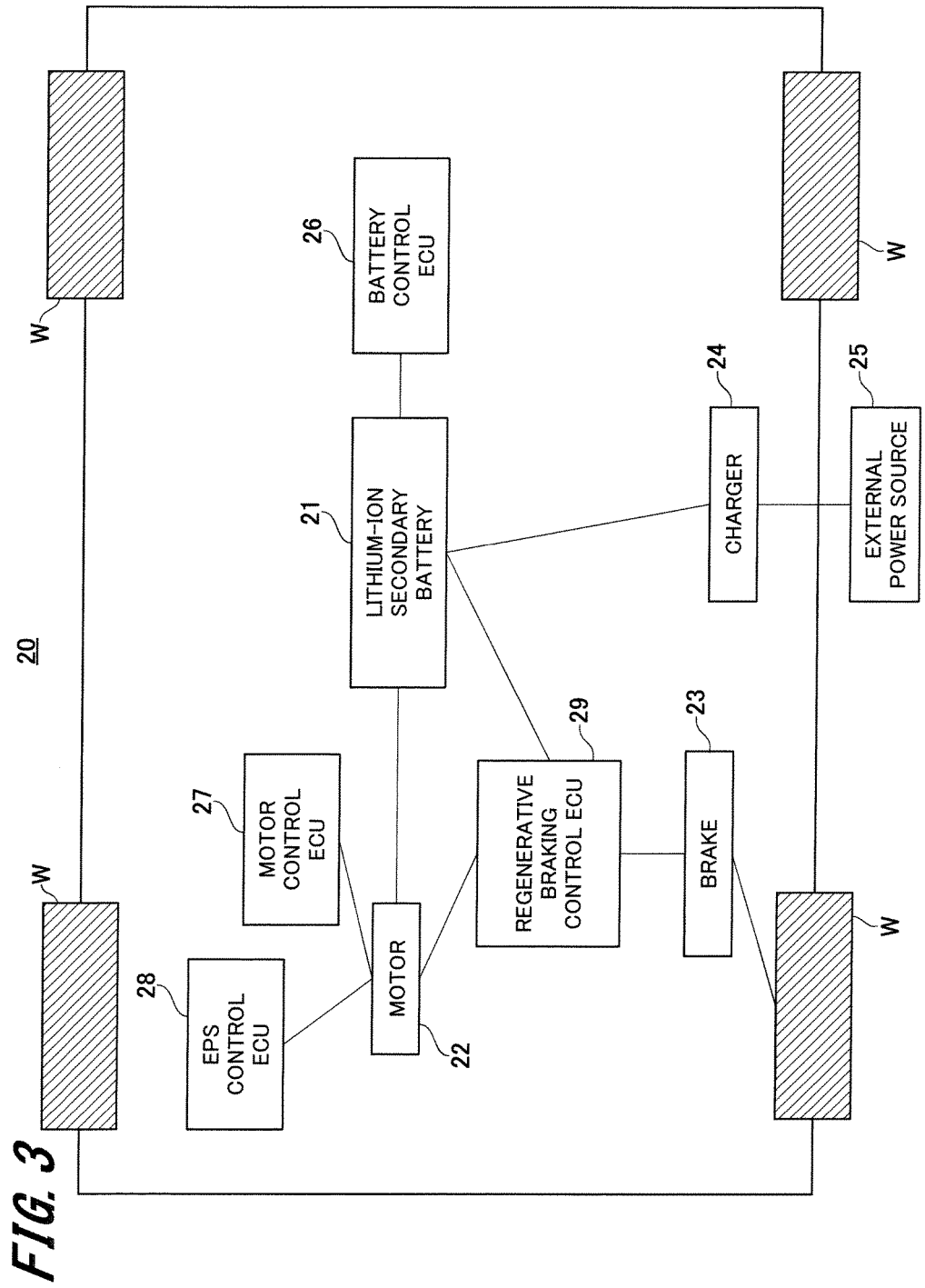
FIG. 3 is a block diagram of an automobile according to an embodiment of the present invention.

A block diagram of an automobile according to an embodiment of the present invention is shown in FIG. 3.

FIG. 3 shows a case where the present invention is applied to an electric vehicle.

An automobile 20 shown in FIG. 3 includes a lithium-ion secondary battery 21 as a power source of an electric vehicle and runs by moving a motor 22 with the lithium-ion secondary battery 21. A brake 23 is connected to a wheel W. The automobile 20 also includes a charger 24 and an external power source 25 for charging the lithium-ion secondary battery 21.

To the lithium-ion secondary battery 21, a battery control ECU 26 is connected, and the lithium-ion secondary battery 21 is controlled by the battery control ECU 26.

To the motor 22, a motor control ECU 27 and an EPS control ECU 28 are connected, and the motor 22 is controlled by the motor control ECU 27. The EPS control ECU 28 controls electric power steering (EPS).

Between the lithium-ion secondary battery 21 and the motor 22 and the brake 23, a regenerative braking control ECU 29 is provided, and the regenerative braking control ECU 29 controls regenerative braking of the brake 23.

In this embodiment, a lithium-ion secondary battery that includes the separator for an electrochemical element of the present invention may be employed as the lithium-ion secondary battery 21.

Furthermore, in this embodiment, a capacitor or an electric double layer capacitor that includes the separator for an electrochemical element of the present invention may be employed as the battery control ECU 26, the motor control ECU 27, the EPS control ECU 28, and the regenerative braking control ECU 29.

A lithium-ion secondary battery, a capacitor, or an electric double layer capacitor that includes the separator for an electrochemical element of the present invention provides the separator with a sufficient shielding performance, mechanical strength, and chemical stability. Therefore, in the lithium ion secondary battery, the capacitor, or the electric double layer capacitor, it is possible to achieve reduction in short-circuit failures, improvement in resistance to vibration and temperature, and stabilization of characteristics after a long period of use.

Accordingly, it is possible to fabricate the automobile 20 having high safeness and high reliability.

Figure 4:
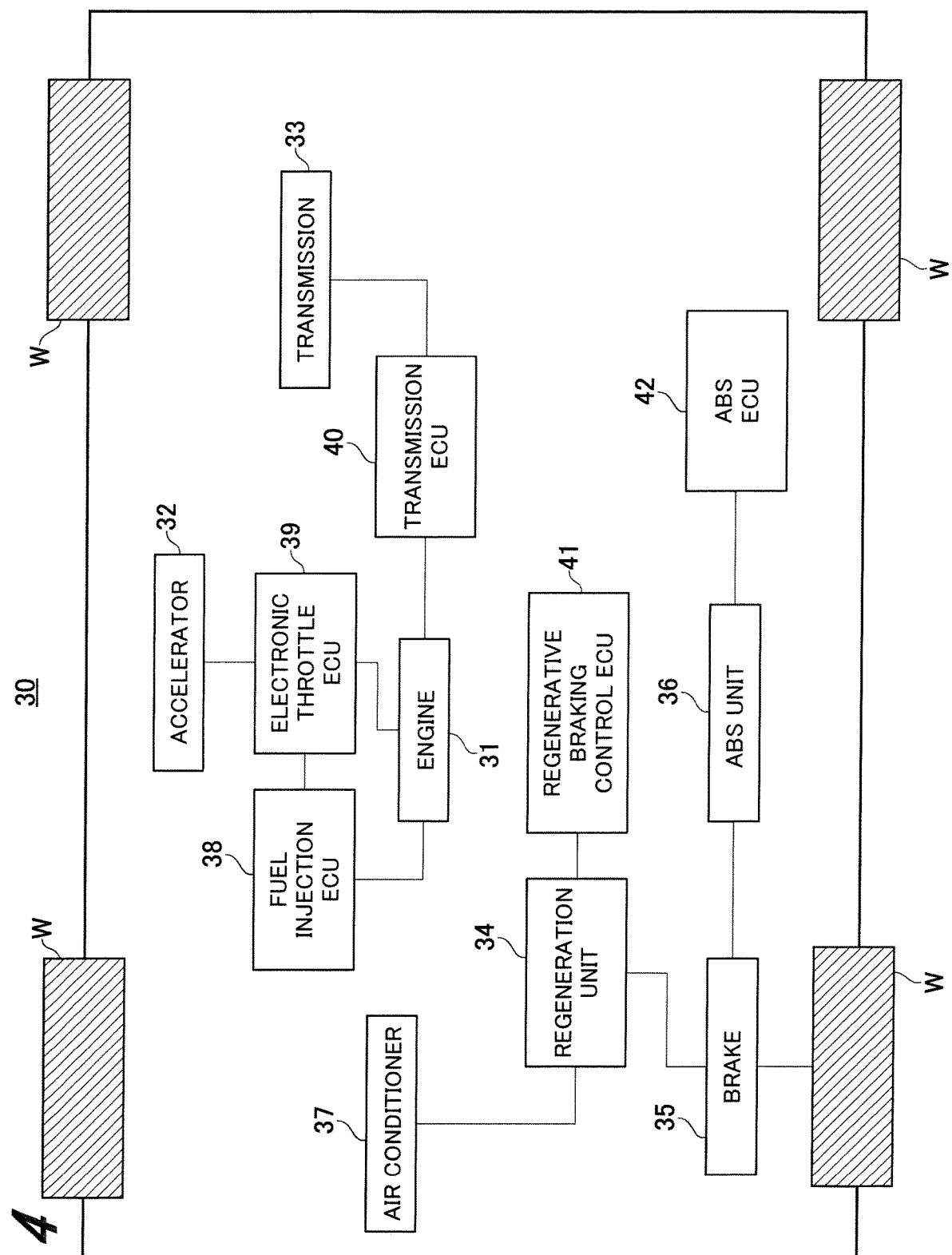
FIG. 4 is a block diagram of an automobile according to another embodiment of the present invention.

A block diagram of an automobile according to another embodiment of the present invention is shown in FIG. 4.

FIG. 4 shows a case where the present invention is applied to an engine vehicle including a regenerative system.

An automobile 30 shown in FIG. 4 is provided with an engine 31 as a power source, and in a power system including the engine 31, the automobile 30 is provided with an accelerator 32 and a transmission 33. A brake 35 is connected to a wheel W, and to the brake 35, a regeneration unit 34 and an ABS unit 36 are connected. The ABS unit 36 performs an anti-lock brake system (ABS) function. The automobile 30 also includes an air conditioner 37 for air conditioning inside the automobile.

To the engine 31, a fuel injection ECU 38 is connected, and the fuel injection ECU 38 controls fuel injection of the engine 31. Between the engine 31 and the accelerator 32, an electronic throttle ECU 39 is provided, and between the engine 31 and the transmission 33, a transmission ECU 40 is provided. To the regeneration unit 34, a regenerative braking control ECU 41 is connected, and the regenerative braking control ECU 41 controls regenerative braking of the regeneration unit 34. To the ABS unit 36, an ABS ECU 42 is connected, and the ABS ECU 42 controls the operation of the ABS unit 36.

In this embodiment, a capacitor or an electric double layer capacitor that includes the separator for an electrochemical element of the present invention may be employed as the fuel injection ECU 38, the electronic throttle ECU 39, the transmission ECU 40, the regenerative braking control ECU 41, and the ABS ECU 42.

A capacitor or an electric double layer capacitor that includes the separator for an electrochemical element of the present invention provides the separator with a sufficient shielding performance, mechanical strength, and chemical stability. Therefore, in the capacitor or the electric double layer capacitor, it is possible to achieve reduction in short-circuit failures, improvement in resistance to vibration and temperature, and stabilization of characteristics after a long period of use.

Accordingly, it is possible to fabricate the automobile 30 having high safeness and high reliability.

Figure 5:
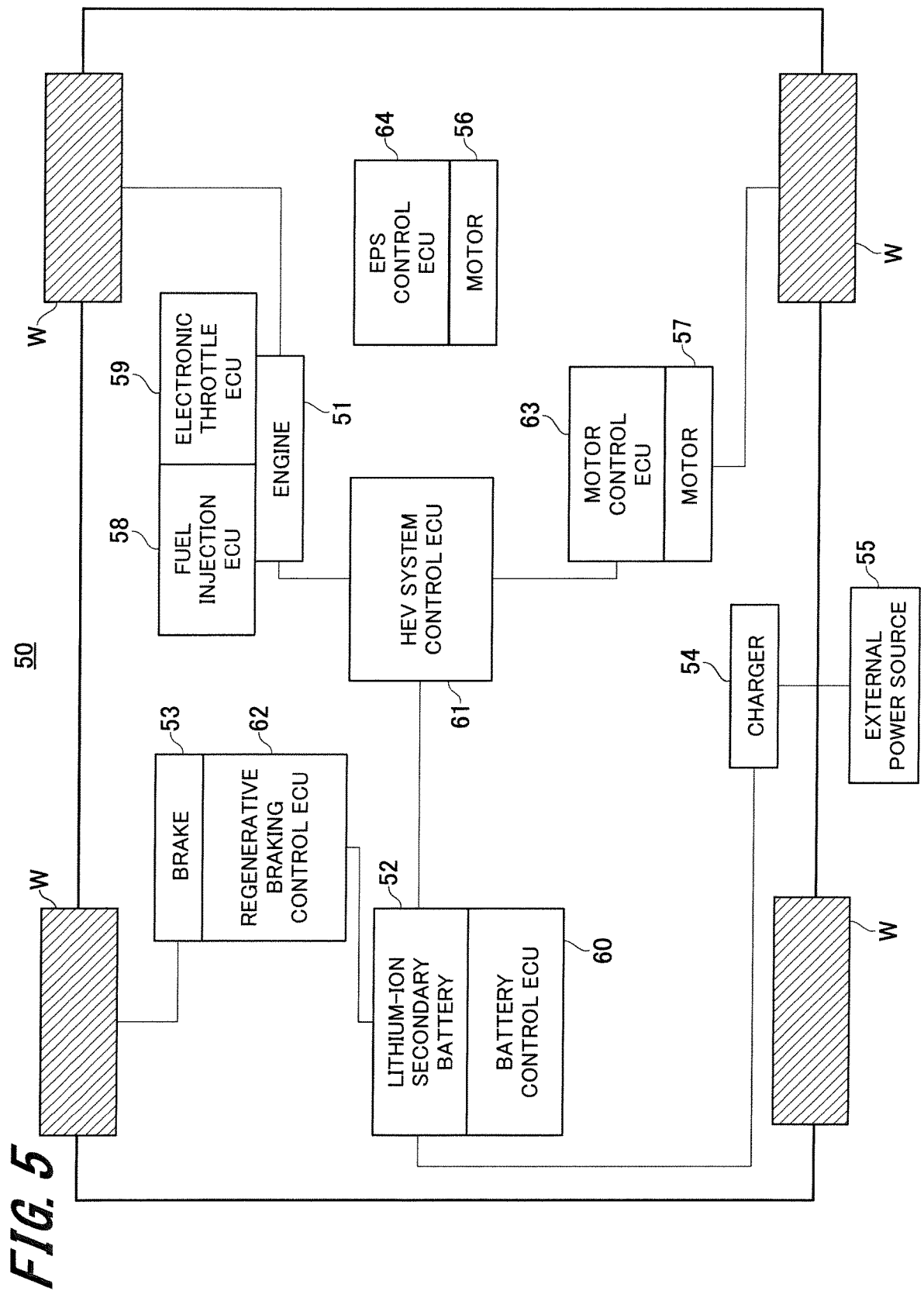
FIG. 5 is a block diagram of an automobile according to another embodiment of the present invention.

A block diagram of an automobile according to another embodiment of the present invention is shown in FIG. 5.

FIG. 5 shows a case where the present invention is applied to a hybrid vehicle.

An automobile 50 shown in FIG. 5 is a hybrid vehicle, having a configuration common to the automobile 20 or an electric vehicle shown in FIG. 3 and a configuration common to the automobile 30 or an engine vehicle shown in FIG. 4.

The automobile 50 shown in FIG. 5 includes an engine 51 and a lithium-ion secondary battery 52 as power sources. A brake 53 and a motor 57 are connected to wheels W. The automobile 50 also includes a charger 54 and an external power source 55 for charging the lithium-ion secondary battery 52. Separately from the motor 57 for driving the wheels W, the automobile 50 is provided with a motor 56 for electric power steering (EPS).

To the engine 51, a fuel injection ECU 58 and an electronic throttle ECU 59 are connected.

To the lithium-ion secondary battery 52, a battery control ECU 60 is connected, and the lithium-ion secondary battery 52 is controlled by the battery control ECU 60.

The automobile 50 is provided with an HEV system control ECU 61 in a central portion of FIG. 5, and the HEV system control ECU 61 controls changeover between the engine 51 and the lithium-ion secondary battery 52.

To the brake 53, a regenerative braking control ECU 62 is connected, and the regenerative braking control ECU 62 controls regenerative braking of the brake 53. To the motor 57 connected to the wheel W, a motor control ECU 63 is connected, and the motor 57 is controlled by the motor control ECU 63. To the motor 56 for EPS, an EPS control ECU 64 is connected, and the EPS control ECU 64 controls electric power steering (EPS).

In this embodiment, a lithium-ion secondary battery that includes the separator for an electrochemical element of the present invention may be employed as the lithium-ion secondary battery 52.

Furthermore, in this embodiment, a capacitor or an electric double layer capacitor that includes the separator for an electrochemical element of the present invention may be employed as the fuel injection ECU 58, the electronic throttle ECU 59, the battery control ECU 60, the HEV system control ECU 61, the regenerative braking control ECU 62, the motor control ECU 63, and EPS control ECU 64.

A lithium-ion secondary battery, a capacitor, or an electric double layer capacitor that includes the separator for an electrochemical element of the present invention provides the separator with a sufficient shielding performance, mechanical strength, and chemical stability. Therefore, in the lithium ion secondary battery, the capacitor, or the electric double layer capacitor, it is possible to achieve reduction in short-circuit failures, improvement in resistance to vibration and temperature, and stabilization of characteristics after a long period of use.

Accordingly, it is possible to fabricate the automobile 50 having high safeness and high reliability.

There are other types of hybrid vehicles in which those parts that function as batteries and engines as well as connection relationships between the parts are different from the configuration shown in FIG. 5. The present invention is also applicable to a hybrid vehicle of such types, and the electrochemical element of the present invention may be mounted on the hybrid vehicle.

Hereinafter described is several embodiments of the electronic device of the present invention, that is, the electrochemical element of the present invention (the electrochemical element including the separator of the present invention) applied to an electronic device.

A block diagram of an electronic device according to an embodiment of the present invention is shown in FIG. 6.

FIG. 6 shows a case where the present invention is applied to an electronic device that performs power assist with an electric double layer capacitor.

An electronic device 70 shown in FIG. 6 includes a power source 71, a load (such as LED) 72, and an electric double layer capacitor 73.

The electric double layer capacitor 73 accumulates electricity from the power source 71 and assists the power source 71 by discharging the accumulated electricity.

In this embodiment, an electric double layer capacitor that includes the separator for an electrochemical element of the present invention may be employed as the electric double layer capacitor 73.

An electric double layer capacitor that includes the separator for an electrochemical element of the present invention provides the separator with a sufficient shielding performance, mechanical strength, and chemical stability. Therefore, in the electric double layer capacitor, it is possible to achieve reduction in short-circuit failures, improvement in resistance to vibration and voltage as well as temperature, reduction in resistance and size due to reduction in thickness, and stabilization of characteristics after a long period of use.

Accordingly, it is possible to fabricate the electronic device 70 having a compact size and high reliability.

A block diagram of an electronic device according to another embodiment of the present invention is shown in FIG. 7.

FIG. 7 shows a case where the present invention is applied to an electronic device that backs up a main power source with an electric double layer capacitor.

An electronic device 80 shown in FIG. 7 includes a lithium-ion secondary battery or the like 81 as a main power source, a load 82, and an electric double layer capacitor 83 as a backup power source.

The electric double layer capacitor 83 is connected between the lithium-ion secondary battery or the like 81 as the main power source and the load 82. As indicated by x in FIG. 7, when the main power source is not available, the main power source is backed up by the electric double layer capacitor 83.

In this embodiment, a lithium-ion secondary battery or the like that includes the separator for an electrochemical element of the present invention may be employed as the lithium-ion secondary battery or the like 81.

Furthermore, in this embodiment, an electric double layer capacitor that includes the separator for an electrochemical element of the present invention may be employed as the electric double layer capacitor 83.

A lithium-ion secondary battery or the like or an electric double layer capacitor that includes the separator for an electrochemical element of the present invention provides the separator with a sufficient shielding performance, mechanical strength, and chemical stability. Therefore, in the lithium ion secondary battery or the electric double layer capacitor, it is possible to achieve reduction in short-circuit failures, improvement in resistance to vibration and voltage as well as temperature, reduction in resistance and size due to reduction in thickness, and stabilization of characteristics after a long period of use.

Accordingly, it is possible to fabricate the electronic device 80 having a compact size and high reliability.

EXAMPLES

Hereinafter described are details on specific Examples, Comparative Examples, and Conventional Examples of the separator for an electrochemical element of the present invention and the electrochemical element including the separator for an electrochemical element of the present invention.

In the following Examples, lithium-ion secondary batteries (cylindrical and coin type) and electric double layer capacitors were prepared as electrochemical elements.

As for the separator in each of the following Examples of the present invention, a nonwoven fabric was obtained by papermaking using a Fourdrinier paper machine, a Fourdrinier cylinder paper machine, or a Tanmo paper machine. In other words, the separator was made of a wet-laid nonwoven fabric.

(Method for Measuring Characteristics of Separator)

Characteristics of the separator for an electrochemical element according to this embodiment were specifically measured under the following conditions and by the following methods.

(Mean Fiber Length)

A length-weighted mean fiber length was measured with Fiber Tester Code 912 (available from Lorentzen & Wettre) in accordance with "JIS P8226-2 Pulps-Determination of fibre length by automated optical analysis-Part 2: Unpolarized light method (ISO 16065-2)", and was regarded as the mean fiber length.

(CSF Value)

A CSF value was measured in accordance with "JIS P8121-2 Pulps-Determination of drainability-Part 2: Canadian Standard freeness method".

(Thickness)

A thickness of the separator was measured with a micrometer in "5.1.1 Measuring instrument and measuring method-a. with external micrometer" prescribed in "JIS C 2300-2 'Cellulosic papers for electrical purposes-Part 2: Methods of test' 5.1 Thickness", and was measured by a method of folding a sheet of paper in ten which is specified in "5.1.3 Measurement of thickness by folding paper".

(Density)

A density of the separator in an absolutely dry state was measured by a method prescribed in the method B of "JIS C 2300-2 'Cellulosic papers for electrical purposes-Part 2: Methods of test' 7.0A Density".

(Tensile Strength)

A tensile strength of the separator in a longitudinal direction was measured by a method prescribed in "JIS C 2300-2 'Cellulosic papers for electrical purposes-Part 2: Methods of test' 8. Tensile strength and elongation".

(Air Resistance)

A time taken for permeation of air in amount of 100 ml was measured with a B-type testing machine in "5. Gurley testing method" prescribed in "JIS P 8117 'Paper and board-Determination of air permeance and air resistance (medium range)-Gurley method".

In regard to specimens having an air resistance of less than 1.4 seconds, five of those specimens were piled on top of each other, and the air resistance was measured. A value obtained was divided by 5, and the resulting value was regarded as the air resistance.

(Cross-Sectional Structure)

Using a sharp knife, the separator was cut in a lateral direction (CD direction). A cross-section of the separator was imaged with a scanning electron microscope (model number: JSM-5600 LV (available from JEOL)) at a magnification of 1000 times (imaging area: 100 μm×130 μm).

In regard to each part obtained by bisecting the imaged separator in a thickness direction, the number of synthetic fibers was counted.

The number of fibers crossing the center line that bisects the cross-section was counted in a manner similar to the way described in FIG. 2. In other words, when the cross-section of a synthetic fiber was eccentrically located in the A part, the synthetic fiber was counted as 0.75 in the A part and 0.25 in the B part, and when the cross-section of a synthetic fiber was eccentrically located in the B part, the synthetic fiber was counted as 0.25 in the A part and 0.75 in the B part, and when the cross-section of a synthetic fiber was uniformly contained in the A part and the B part, the synthetic fiber was counted as 0.5 in the A part and 0.5 in the B part.

The number of the synthetic fibers in the A part was divided by the number of the synthetic fibers in the B part, and a value obtained was regarded as a ratio of the synthetic fibers (A/B value).

The number of stems of regenerated cellulose fibers was counted in a manner similar to the way of counting the number of the synthetic fibers. The number of the stems of regenerated cellulose fibers in the B part was divided by the number of the stems of regenerated cellulose fibers in the A part, and a value obtained was regarded as a ratio of the stems of regenerated cellulose fibers (B/A value).

Ten arbitrarily selected points were imaged, and the number of fibers in the points was counted for each example. An average value obtained was used to calculate each ratio.

(Production of Lithium-Ion Secondary Battery Including Separator)

Hereinafter described is a method of producing a lithium-ion secondary battery that includes the separator according to this embodiment. Specifically, two types of lithium-ion secondary batteries were prepared, that is, a cylindrical lithium-ion secondary battery and a coin type lithium secondary battery.

The cylindrical lithium-ion secondary battery was prepared in the following manner.

A lithium cobalt oxide electrode for a lithium-ion secondary battery was used as a positive electrode material, and a graphite electrode was used as a negative electrode material. Those electrode materials were wound together with the separator, whereby obtaining a lithium-ion secondary battery element. The element was housed in a bottomed cylindrical case, and an electrolytic solution in which lithium tetrafluoroborate was dissolved as an electrolyte into a propylene carbonate solvent was injected in the case, and then, the case was sealed with a press machine, whereby preparing a lithium-ion secondary battery.

The coin type lithium-ion secondary battery was prepared in the following manner.

A lithium cobalt oxide electrode for a lithium-ion secondary battery was used as a positive electrode material, and a graphite electrode was used as a negative electrode material. Those electrode materials were laminated with the separator interposed therebetween. Next, the electrodes and the separator were impregnated with an electrolytic solution in which lithium hexafluorophosphate, an electrolyte, was dissolved in a mixed solvent of diethylene carbonate and ethylene carbonate, and the electrodes and the separator were caulked, whereby preparing a lithium-ion secondary battery.

In each Example, a part (B part) of the separator with a large number of thermoplastic synthetic fibers is disposed on the positive electrode of the lithium-ion secondary battery.

(Production of Electric Double Layer Capacitor Including Separator)

Hereinafter described is a method of producing an electric double layer capacitor that includes the separator according to this embodiment.

An activated carbon electrode and the separator of the present invention were folded alternately to obtain an electric double layer capacitor element. The element was housed in an aluminum case, and an electrolytic solution in which triethylmethylammonium hexafluorophosphate was dissolved in acetonitrile was injected in the aluminum case. After vacuum impregnation, the aluminum case was sealed, whereby preparing an electric double layer capacitor.

Unless otherwise specified, the electric double layer capacitor in each Example was prepared by disposing the part (B part) in the separator with the large number of the thermoplastic synthetic fibers on the positive electrode of the electric double layer capacitor.

In each example, 1000 electrochemical elements were prepared and used for the following characteristic evaluation.

(Evaluation on Initial Characteristics of Electrochemical Element)

Initial characteristics of the electrochemical element according to this embodiment were evaluated under the following conditions and by the following methods.

(Short-Circuit Failure Rate)

In regard to a short-circuit failure rate of the electrochemical element, when a charging voltage did not rise to a rated voltage, such a condition was regarded as a short-circuit failure. The number of the electrochemical elements with short-circuit failures was divided by the number of the electrochemical elements prepared, and a value obtained was expressed in percentage and regarded as the short-circuit failure rate.

(Evaluation on Characteristics of Lithium-Ion Secondary Battery)

(Discharge Capacity)

A discharge capacity of the lithium-ion secondary battery was measured in accordance with "8.4.1 Discharge test" prescribed in "JIS C 8715-1" Secondary lithium cells and batteries for use in industrial applications-Part 1: Tests and requirements of performance".

(Internal Resistance)

An internal resistance of the lithium-ion secondary battery was measured in accordance with "8.6.3 Alternate current internal resistance" prescribed in "JIS C 8715-1" Secondary lithium cells and batteries for use in industrial applications-Part 1: Tests and requirements of performance".

(Overcharge Test Failure Rate)

An overcharge test was performed on the coin type and the cylindrical lithium-ion secondary batteries without short-circuit failures, and an overcharge test failure rate was regarded as an indicator of the shielding performance of the separator. This test was conducted with severe operating conditions in mind and was conducted to quantify an influence due to a difference in shielding performance of the separators which is not observed in a normal short-circuit failure test.

Specifically, when each of the lithium-ion secondary batteries prepared was subjected to constant current charging at 60° C. at a rate of 1.0 C up to 5.0 V, a condition where a charging voltage did not rise to a rated voltage was regarded as a failure. The number of lithium-ion secondary batteries with failures was divided by the number of the lithium-ion secondary batteries prepared for measurement, and a value obtained was expressed in percentage and regarded as the overcharge test failure rate.

(Evaluation on Characteristic of Electric Double Layer Capacitor)

(Capacitance)

A capacitance of the electric double layer capacitor was obtained by a constant current discharge method described in "4.5 Capacitance" prescribed in "JIS C 5160-1 'Fixed electric double-layer capacitors for use in electronic equipment'".

(Internal Resistance)

An internal resistance of the electric double layer capacitor was measured by an alternating current (a.c.) resistance method in "4.6 Internal resistance" prescribed in "JIS C 5160-1 'Fixed electric double-layer capacitors for use in electronic equipment'".

(Leakage Current)

In accordance with "4.7 Leakage current" prescribed in "JIS C 5160-1 'Fixed electric double-layer capacitors for use in electronic equipment'", a leakage current of the electric double layer capacitor, an index of the shielding performance of the separator, was measured in 30 minutes of voltage application time.

(Long-Term Reliability Test of Electrochemical Element)

Using the electrochemical element of each example that passed the above measurement, and a long-term reliability test was conducted by applying a rated voltage to the electrochemical element for 500 hours at 70° C.

(Short-Circuit Failure Rate after Long-Term Reliability Test)

In regard to electrochemical elements in which short-circuit failures occurred during the long-term reliability test, the number of those electrochemical elements was counted. The number of the elements was divided by the number of electrochemical elements subjected to the long-term reliability test, and a value obtained was expressed in percentage and regarded as the short-circuit failure rate after the long-term reliability test.

(Volume Decrease Rate and Internal Resistance Increase Rate)

By a method similar to the evaluation on the initial characteristics, a capacity and an internal resistance after the long-term reliability test were measured, and a capacity decrease rate and an internal resistance increase rate were determined based on the following Formulae 1 and 2.

$$\text{Capacity decrease rate (\%)} = (Ca - Cb)/Ca \times 100 \quad \text{Formula 1}$$

(Ca: capacity before applying voltage, Cb: capacity after applying voltage)

$$\text{Internal resistance increase rate (\%)} = (Rb - Ra)/Ra \times 100 \quad \text{Formula 2}$$

(Ra: internal resistance before applying voltage, Rb: internal resistance after applying voltage)

Hereinafter described are specific Examples according to the present invention, and Comparative Examples and Conventional Examples.

The CSF value in each example indicates a CSF value on the decreasing side unless otherwise specified.

Example 1

As beaten regenerated cellulose fibers, 70 mass % of solvent-spun rayon fibers (hereinafter referred to as "lyocell fibers") having a mean fiber length of 0.68 mm and a CSF value of 25 ml on the increasing side were mixed with 30 mass % of polyethylene terephthalate fibers (hereinafter referred to as PET fibers), as thermoplastic synthetic fibers, having a mean fiber length of 3 mm and a fiber diameter of 2.0 μm. The mixed fibers were subjected to Fourdrinier papermaking to yield a separator having a thickness of 10.0 μm, a density of 0.26 g/cm$^3$, a tensile strength of 15 N, and an air resistance of 3.5 seconds. The mean fiber length of the lyocell fibers of this separator was 0.68 mm. Furthermore, this separator had an A/B value of 0.37 and a B/A value of 0.51.

Using this separator, a coin type lithium-ion secondary battery of Example 1 was prepared.

Example 2

As beaten regenerated cellulose fibers, 70 mass % of polynosic rayon fibers having a mean fiber length of 0.65 mm and a CSF value of 25 ml on the increasing side were mixed with 30 mass % of PET fibers, as thermoplastic synthetic fibers, having a mean fiber length of 3 mm and a fiber diameter of 2.5 μm. The mixed fibers were subjected to Fourdrinier papermaking to yield a separator having a thickness of 25.0 μm, a density of 0.48 g/cm$^3$, a tensile strength of 25 N, and an air resistance of 7.9 seconds. This separator had an A/B value of 0.45 and a B/A value of 0.50.

Using this separator, a coin type lithium-ion secondary battery of Example 2 was prepared.

Example 3

As beaten regenerated cellulose fibers, 70 mass % of lyocell fibers having a mean fiber length of 0.68 mm and a CSF value of 25 ml on the increasing side were mixed with 30 mass % of PET fibers, as thermoplastic synthetic fibers, having a mean fiber length of 3 mm and a fiber diameter of 3.5 μm. The mixed fibers were subjected to Tanmo papermaking to obtain a sheet. This sheet was subjected to calendaring to yield a separator having a thickness of 70.0 μm, a density of 0.86 g/cm$^3$, a tensile strength of 55 N, and an air resistance of 79.2 seconds. This separator had an A/B value of 0.51 and a B/A value of 0.56.

Using this separator, a coin type lithium-ion secondary battery of Example 3 was prepared.

Comparative Example 1

A raw material similar to that in Example 1 was used and subjected to Fourdrinier papermaking, whereby yielding a separator that has a thickness of 10.0 μm, a density of 0.21 g/cm³, a tensile strength of 10 N, and an air resistance of 2.0 seconds. This separator had an A/B value of 0.50 and a B/A value of 0.54.

Using this separator, a coin type lithium-ion secondary battery of Comparative Example 1 was prepared.

Comparative Example 2

A raw material similar to that in Example 1 was used and subjected to Fourdrinier papermaking, whereby yielding a separator that has a thickness of 8.0 µm, a density of 0.26 g/cm³, a tensile strength of 10 N, and an air resistance of 2.0 seconds. This separator had an A/B value of 0.46 and a B/A value of 0.52.

Using this separator, a coin type lithium-ion secondary battery of Comparative Example 2 was prepared.

Comparative Example 3

A raw material similar to that in Example 1 was used and subjected to cylinder papermaking, whereby yielding a separator that has a thickness of 25.0 µm, a density of 0.48 g/cm³, a tensile strength of 13 N, and an air resistance of 0.4 seconds. This separator had an A/B value of 0.97 and a B/A value of 0.94.

Using this separator, a coin type lithium-ion secondary battery of Comparative Example 3 was prepared.

Comparative Example 4

A raw material similar to that in Example 3 was used and subjected to Tanmo papermaking and calendaring, whereby yielding a separator that has a thickness of 75.0 µm, a density of 0.93 g/cm³, a tensile strength of 60 N, and an air resistance of 123.2 seconds. This separator had an A/B value of 0.59 and a B/A value of 0.52.

Using this separator, a coin type lithium-ion secondary battery of Comparative Example 4 was prepared.

Conventional Example 1

Using a microporous polyethylene film as a separator, a coin type lithium-ion secondary battery of Conventional Example 1 was prepared.

This separator had a thickness of 25.0 µm, a density of 0.60 g/cm³, a tensile strength of 40 N, and an air resistance of 110.0 seconds.

Example 4

As beaten regenerated cellulose fibers, 80 mass % of lyocell fibers having a mean fiber length of 1.91 mm and a CSF value of 100 ml were mixed with 20 mass % of PET fibers, as thermoplastic synthetic fibers, having a mean fiber length of 3 mm and a fiber diameter of 2.5 µm. The mixed fibers were subjected to Fourdrinier papermaking to yield a separator having a thickness of 30.0 µm, a density of 0.40 g/cm³, a tensile strength of 20 N, and an air resistance of 4.4 seconds. This separator had an A/B value of 0.84 and a B/A value of 0.81.

Using this separator, a cylindrical lithium-ion secondary battery of Example 4 was prepared.

Example 5

As beaten regenerated cellulose fibers, 75 mass % of lyocell fibers having a mean fiber length of 0.77 mm and a CSF value of 3 ml on the increasing side were mixed with 25 mass % of PET fibers, as thermoplastic synthetic fibers, having a mean fiber length of 3 mm and a fiber diameter of 3.0 µm. The mixed fibers were subjected to Fourdrinier papermaking to yield a separator having a thickness of 20.0 µm, a density of 0.45 g/cm³, a tensile strength of 18 N, and an air resistance of 5.3 seconds. This separator had an A/B value of 0.59 and a B/A value of 0.73.

Using this separator, a cylindrical lithium-ion secondary battery of Example 5 was prepared.

Example 6

As beaten regenerated cellulose fibers, 80 mass % of lyocell fibers having a mean fiber length of 0.89 mm and a CSF value of 0 ml were mixed with 20 mass % of polyethylene fibers, as thermoplastic synthetic fibers, having a mean fiber length of 3 mm and a fiber diameter of 5.0 µm. The mixed fibers were subjected to Fourdrinier papermaking to obtain a sheet. This sheet was subjected to calendaring to yield a separator having a thickness of 15.0 µm, a density of 0.73 g/cm³, a tensile strength of 30 N, and an air resistance of 15.0 seconds. This separator had an A/B value of 0.59 and a B/A value of 0.78.

Using this separator, a cylindrical lithium-ion secondary battery of Example 6 was prepared.

Example 7

As beaten regenerated cellulose fibers, 80 mass % of lyocell fibers having a mean fiber length of 0.55 mm and a CSF value of 50 ml on the increasing side were mixed with 20 mass % of polypropylene fibers, as thermoplastic synthetic fibers, having a mean fiber length of 3 mm and a fiber diameter of 2.0 µm. The mixed fibers were subjected to Fourdrinier papermaking to obtain a sheet. This sheet was subjected to calendaring to yield a separator having a thickness of 20.0 µm, a density of 0.68 g/cm³, a tensile strength of 45 N, and an air resistance of 12.8 seconds. This separator had an A/B value of 0.59 and a B/A value of 0.74.

Using this separator, a cylindrical lithium-ion secondary battery of Example 7 was prepared.

Example 8

As beaten regenerated cellulose fibers, 80 mass % of lyocell fibers having a mean fiber length of 0.49 mm and a CSF value of 200 ml on the increasing side were mixed with 10 mass % of PET fibers having a mean fiber length of 2.0 mm and a fiber diameter of 1.5 µm and with 10 mass % of polypropylene fibers having a mean fiber length of 5.0 mm and a fiber diameter of 8 µm as thermoplastic synthetic fibers. The mixed fibers were subjected to Fourdrinier papermaking to yield a separator having a thickness of 40.0 µm, a density of 0.40 g/cm³, a tensile strength of 30 N, and an air resistance of 6.2 seconds. This separator had an A/B value of 0.63 and a B/A value of 0.67.

Using this separator, a cylindrical lithium-ion secondary battery of Example 8 was prepared.

Example 9

As beaten regenerated cellulose fibers, 80 mass % of lyocell fibers having a mean fiber length of 0.42 mm and a CSF value of 300 ml on the increasing side were mixed with 20 mass % of polyacrylonitrile fibers, as thermoplastic synthetic fibers, having a mean fiber length of 3.0 mm and a fiber diameter of 5 µm. The mixed fibers were subjected to Fourdrinier papermaking to yield a separator having a thickness of 50.0 µm, a density of 0.32 g/cm$^3$, a tensile strength of 32 N, and an air resistance of 4.2 seconds. This separator had an A/B value of 0.74 and a B/A value of 0.74.

Using this separator, a cylindrical lithium-ion secondary battery of Example 9 was prepared.

Example 10

As beaten regenerated cellulose fibers, 80 mass % of lyocell fibers having a mean fiber length of 0.26 mm and a CSF value of 700 ml on the increasing side were mixed with 20 mass % of PET fibers, as thermoplastic synthetic fibers, having a mean fiber length of 3.0 mm and a fiber diameter of 8 µm. The mixed fibers were subjected to Fourdrinier papermaking to yield a separator having a thickness of 60.0 µm, a density of 0.50 g/cm$^3$, a tensile strength of 40 N, and an air resistance of 9.7 seconds. This separator had an A/B value of 0.79 and a B/A value of 0.83.

Using this separator, a cylindrical lithium-ion secondary battery of Example 10 was prepared.

Comparative Example 5

As beaten regenerated cellulose fibers, 80 mass % of lyocell fibers having a mean fiber length of 2.12 mm and a CSF value of 150 ml were mixed with 20 mass % of PET fibers, as thermoplastic synthetic fibers, having a mean fiber length of 3 mm and a fiber diameter of 2.5 µm. The mixed fibers were subjected to Fourdrinier papermaking to yield a separator having a thickness of 30.0 µm, a density of 0.40 g/cm$^3$, a tensile strength of 12 N, and an air resistance of 4.0 seconds. This separator had an A/B value of 0.87 and a B/A value of 0.83.

Using this separator, a cylindrical lithium-ion secondary battery of Comparative Example 5 was prepared.

Comparative Example 6

As beaten regenerated cellulose fibers, 80 mass % of lyocell fibers having a mean fiber length of 0.18 mm and a CSF value of 750 ml on the increasing side were mixed with 20 mass % of PET fibers, as thermoplastic synthetic fibers, having a mean fiber length of 3 mm and a fiber diameter of 8.0 µm. The mixed fibers were subjected to Fourdrinier papermaking to yield a separator having a thickness of 60.0 µm, a density of 0.50 g/cm$^3$, a tensile strength of 30 N, and an air resistance of 3.3 seconds. This separator had an A/B value of 0.59 and a B/A value of 0.87.

Using this separator, a cylindrical lithium-ion secondary battery of Comparative Example 6 was prepared.

Conventional Example 2

A raw material similar to that in Example 5 was used, and a combination of Tanmo papermaking and cylinder papermaking was performed on a Tanmo layer and a cylinder layer each having a substantially equal thickness, whereby yielding a separator that has a thickness of 25.0 µm, a density of 0.48 g/cm$^3$, a tensile strength of 45 N, and an air resistance of 2.6 seconds.

Since this separator is different from the separator of the present invention that is formed into a single layer in an integrated manner, an A/B value and a B/A value were not calculated.

Using this separator, a cylindrical lithium-ion secondary battery of Conventional Example 2 was prepared.

Conventional Example 3

As beaten regenerated cellulose fibers, 75 mass % of lyocell fibers having a mean fiber length of 0.77 mm and a CSF value of 3 ml on the increasing side were mixed with 25 mass % of PET fibers, as thermoplastic synthetic fibers, having a mean fiber length of 3 mm and a fiber diameter of 10.0 µm. The mixed fibers were subjected to Tanmo papermaking to yield a separator having a thickness of 30.0 µm, a density of 0.40 g/cm$^3$, a tensile strength of 12 N, and an air resistance of 3.1 seconds. This separator had an A/B value of 0.88 and a B/A value of 0.88.

Using this separator, a cylindrical lithium-ion secondary battery of Conventional Example 3 was prepared.

Example 11

Using a separator similar to Example 7, a laminated electric double layer capacitor of Example 11 was prepared.

Example 12

As beaten regenerated cellulose fibers, 90 mass % of lyocell fibers having a mean fiber length of 0.77 mm and a CSF value of 3 ml on the increasing side were mixed with 10 mass % of PET fibers, as thermoplastic synthetic fibers, having a mean fiber length of 3 mm and a fiber diameter of 8.0 µm. The mixed fibers were subjected to Fourdrinier papermaking to yield a separator having a thickness of 30.0 µm, a density of 0.40 g/cm$^3$, a tensile strength of 16 N, and an air resistance of 4.6 seconds. This separator had an A/B value of 0.59 and a B/A value of 0.64.

Using this separator, a laminated electric double layer capacitor of Example 12 was prepared.

Example 13

As beaten regenerated cellulose fibers, 75 mass % of lyocell fibers having a mean fiber length of 0.77 mm and a CSF value of 3 ml on the increasing side were mixed with 25 mass % of PET fibers, as thermoplastic synthetic fibers, having a mean fiber length of 1 mm and a fiber diameter of 0.6 µm. The mixed fibers were subjected to Fourdrinier papermaking to yield a separator having a thickness of 35.0 µm, a density of 0.40 g/cm$^3$, a tensile strength of 30 N, and an air resistance of 5.1 seconds. This separator had an A/B value of 0.59 and a B/A value of 0.73.

Using this separator, a laminated electric double layer capacitor of Example 13 was prepared.

Example 14

As beaten regenerated cellulose fibers, 60 mass % of lyocell fibers having a mean fiber length of 0.77 mm and a CSF value of 3 ml on the increasing side were mixed with 40 mass % of PET fibers, as thermoplastic synthetic fibers, having a mean fiber length of 3 mm and a fiber diameter of 10.0 µm. The mixed fibers were subjected to Fourdrinier papermaking to yield a separator having a thickness of 30.0 µm, a density of 0.40 g/cm$^3$, a tensile strength of 15 N, and an air resistance of 3.7 seconds. This separator had an A/B value of 0.59 and a B/A value of 0.64.

Using this separator, a laminated electric double layer capacitor of Example 14 was prepared.

Example 15

As beaten regenerated cellulose fibers, 50 mass % of lyocell fibers having a mean fiber length of 0.77 mm and a CSF value of 3 ml on the increasing side were mixed with 50 mass % of PET fibers, as thermoplastic synthetic fibers, having a mean fiber length of 3 mm and a fiber diameter of 3.0 μm. The mixed fibers were subjected to Fourdrinier papermaking to yield a separator having a thickness of 30.0 μm, a density of 0.40 g/cm$^3$, a tensile strength of 40 N, and an air resistance of 3.5 seconds. This separator had an A/B value of 0.59 and a B/A value of 0.67.

Using this separator, a laminated electric double layer capacitor of Example 15 was prepared.

Example 16

Using a separator similar to Example 13, a B part of the separator was disposed on a negative electrode, and an A part of the separator was disposed on a positive electrode, whereby preparing a laminated electric double layer capacitor of Example 16.

Reference Example 1

As beaten regenerated cellulose fibers, 80 mass % of lyocell fibers having a mean fiber length of 0.77 mm and a CSF value of 3 ml on the increasing side were mixed with 20 mass % of PET fibers, as thermoplastic synthetic fibers, having a mean fiber length of 0.5 mm and a fiber diameter of 0.1 μm. The mixed fibers were subjected to Fourdrinier papermaking to yield a separator having a thickness of 30.0 μm, a density of 0.40 g/cm$^3$, a tensile strength of 45 N, and an air resistance of 6.2 seconds. This separator had an A/B value of 0.59 and a B/A value of 0.61.

Using this separator, a laminated electric double layer capacitor of Reference Example 1 was prepared.

Comparative Example 7

As beaten regenerated cellulose fibers, 40 mass % of lyocell fibers having a mean fiber length of 0.77 mm and a CSF value of 3 ml on the increasing side were mixed with 60 mass % of PET fibers, as thermoplastic synthetic fibers, having a mean fiber length of 3.0 mm and a fiber diameter of 2.5 μm. The mixed fibers were subjected to Fourdrinier papermaking to yield a separator having a thickness of 30.0 μm, a density of 0.40 g/cm$^3$, a tensile strength of 25 N, and an air resistance of 2.9 seconds. This separator had an A/B value of 0.58 and a B/A value of 0.64.

Using this separator, a laminated electric double layer capacitor of Comparative Example 7 was prepared.

Conventional Example 4

Using a separator similar to Conventional Example 3, a laminated electric double layer capacitor of Conventional Example 4 was prepared.

Conventional Example 5

Used as beaten regenerated cellulose fibers was lyocell fibers having a mean fiber length of 0.72 mm and a CSF value of 10 ml on the increasing side. The fibers were subjected to Fourdrinier papermaking to yield a separator having a thickness of 20.0 μm, a density of 0.40 g/cm$^3$, a tensile strength of 10 N, and an air resistance of 4.6 seconds. This separator had a B/A value of 0.65.

Using this separator, a laminated electric double layer capacitor of Conventional Example 5 was prepared.

Table 1 shows evaluation results on each separator of Examples 1 to 3, Comparative Examples 1 to 4, and Conventional Example 1 described above, and also shows evaluation results on initial characteristics and evaluation results on characteristics after the long-term reliability test of each lithium-ion secondary battery in those Examples. These are examples of a coin type lithium-ion secondary battery having a rated voltage of 3.6 V, a rated capacity of 30 mAh, a diameter of 20 mm, and a height of 3.2 mm.

TABLE 1

| | | SEPARATOR | | | | |
|---|---|---|---|---|---|---|
| | FIBER TYPE | PROPORTION MASS % | THICKNESS μm | DENSITY g/cm$^3$ | TENSILE STRENGTH N | AIR RESISTANCE SECONDS |
| EXAMPLE 1 | LYOCELL | 70 | 10 | 0.26 | 15 | 3.5 |
| | PET | 30 | | | | |
| EXAMPLE 2 | POLYNOSIC | 70 | 25 | 0.48 | 25 | 7.9 |
| | PET | 30 | | | | |
| EXAMPLE 3 | LYOCELL | 70 | 70 | 0.86 | 55 | 79.2 |
| | PET | 30 | | | | |
| COMPARATIVE EXAMPLE 1 | LYOCELL | 70 | 10 | 0.21 | 10 | 2.0 |
| | PET | 30 | | | | |
| COMPARATIVE EXAMPLE 2 | LYOCELL | 70 | 8 | 0.26 | 10 | 2.0 |
| | PET | 30 | | | | |
| COMPARATIVE EXAMPLE 3 | LYOCELL | 70 | 25 | 0.48 | 13 | 0.4 |
| | PET | 30 | | | | |
| COMPARATIVE EXAMPLE 4 | LYOCELL | 70 | 75 | 0.93 | 60 | 123.2 |
| | PET | 30 | | | | |
| COMPARATIVE EXAMPLE 1 | PE FILM | — | 25 | 0.60 | 40 | 110.0 |

TABLE 1-continued

| | SEPARATOR CROSS-SECTIONAL STRUCTURE | | COIN TYPE LITHIUM-ION SECONDARY BATTERY INITIAL CHARACTERISTICS | | |
|---|---|---|---|---|---|
| | A/B VALUE OF SYNTHETIC FIBERS | B/A VALUE OF CELLULOSE | INTERNAL RESISTANCE mΩ | SHORT-CIRCUIT FAILURE RATE % | OVERCHARGE TEST FAILURE RATE % |
| EXAMPLE 1 | 0.37 | 0.51 | 250 | 0 | 0 |
| EXAMPLE 2 | 0.45 | 0.50 | 260 | 0 | 0 |
| EXAMPLE 3 | 0.51 | 0.56 | 300 | 0 | 0 |
| COMPARATIVE EXAMPLE 1 | 0.50 | 0.54 | 240 | 0.5 | 1.3 |
| COMPARATIVE EXAMPLE 2 | 0.46 | 0.52 | 240 | 0.6 | 1.4 |
| COMPARATIVE EXAMPLE 3 | 0.97 | 0.94 | 220 | 12.5 | 14.2 |
| COMPARATIVE EXAMPLE 4 | 0.59 | 0.52 | 420 | 0 | 0 |
| COMPARATIVE EXAMPLE 1 | — | — | 400 | 0 | 0 |

| | COIN TYPE LITHIUM-ION SECONDARY BATTERY CHARACTERISTICS AFTER RELIABILITY TEST | | | | |
|---|---|---|---|---|---|
| | CAPACITY mAh | CAPACITY DECREASE RATE % | INTERNAL RESISTANCE mΩ | INTERNAL RESISTANCE INCREASE RATE % | SHORT-CIRCUIT FAILURE RATE AFTER RELIABILITY TEST % |
| EXAMPLE 1 | 25.0 | 16.7 | 472 | 88.8 | 0 |
| EXAMPLE 2 | 24.3 | 19.0 | 490 | 88.5 | 0 |
| EXAMPLE 3 | 24.5 | 18.3 | 560 | 86.7 | 0 |
| COMPARATIVE EXAMPLE 1 | 22.0 | 26.7 | 465 | 93.8 | 1.5 |
| COMPARATIVE EXAMPLE 2 | 21.6 | 28.1 | 467 | 94.5 | 1.5 |
| COMPARATIVE EXAMPLE 3 | 24.1 | 19.7 | 415 | 88.6 | 4.2 |
| COMPARATIVE EXAMPLE 4 | 21.3 | 29.0 | 890 | 111.9 | 0 |
| COMPARATIVE EXAMPLE 1 | 21.2 | 29.3 | 915 | 128.8 | 0 |

Table 2 shows evaluation results on each separator of Examples 4 to 10, Comparative Examples 5 and 6, and Conventional Examples 2 and 3 described above, and also shows evaluation results on initial characteristics and evaluation results on characteristics after the long-term reliability test of each lithium-ion secondary battery in those Examples. These are examples of a cylindrical lithium-ion secondary battery having a rated voltage of 3.7 V, a rated capacity of 3000 mAh, a diameter of 18 mm, and a height of 65 mm.

TABLE 2

| | SEPARATOR | | | | | |
|---|---|---|---|---|---|---|
| | FIBER TYPE | PROPORTION MASS % | THICKNESS μm | DENSITY g/cm³ | TENSILE STRENGTH N | AIR RESISTANCE SECONDS |
| EXAMPLE 4 | LYOCELL PET | 80 20 | 30 | 0.40 | 20 | 4.4 |
| EXAMPLE 5 | LYOCELL PET | 75 25 | 20 | 0.45 | 18 | 5.3 |
| EXAMPLE 6 | LYOCELL PET | 80 20 | 15 | 0.73 | 30 | 15.0 |
| EXAMPLE 7 | LYOCELL PET | 80 20 | 20 | 0.68 | 45 | 12.8 |
| EXAMPLE 8 | LYOCELL PET/PP | 80 10/10 | 40 | 0.40 | 30 | 6.2 |
| EXAMPLE 9 | LYOCELL ACRYLIC | 80 20 | 50 | 0.32 | 32 | 4.2 |
| EXAMPLE 10 | LYOCELL PET | 80 20 | 60 | 0.50 | 40 | 9.7 |

TABLE 2-continued

| | | | | | | |
|---|---|---|---|---|---|---|
| COMPARATIVE EXAMPLE 5 | LYOCELL PET | 80 20 | 30 | 0.40 | 12 | 4.0 |
| COMPARATIVE EXAMPLE 6 | LYOCELL PET | 80 20 | 60 | 0.50 | 30 | 3.3 |
| CONVENTIONAL EXAMPLE 2 | LYOCELL PET | 75 25 | 25 | 0.48 | 45 | 2.6 |
| CONVENTIONAL EXAMPLE 3 | LYOCELL PET | 75 25 | 30 | 0.40 | 12 | 3.1 |

| | SEPARATOR CROSS-SECTIONAL STRUCTURE | | CYLINDRICAL LITHIUM-ION SECONDARY BATTERY INITIAL CHARACTERISTICS | | |
|---|---|---|---|---|---|
| | A/B VALUE OF SYNTHETIC FIBERS | B/A VALUE OF CELLULOSE | INTERNAL RESISTANCE mΩ | SHORT-CIRCUIT FAILURE RATE % | OVERCHARGE TEST FAILURE RATE % |
| EXAMPLE 4 | 0.84 | 0.81 | 42 | 0.3 | 0.2 |
| EXAMPLE 5 | 0.59 | 0.73 | 45 | 0 | 0 |
| EXAMPLE 6 | 0.59 | 0.78 | 44 | 0 | 0 |
| EXAMPLE 7 | 0.59 | 0.74 | 45 | 0 | 0 |
| EXAMPLE 8 | 0.63 | 0.67 | 52 | 0.1 | 0.2 |
| EXAMPLE 9 | 0.74 | 0.74 | 55 | 0.1 | 0.3 |
| EXAMPLE 10 | 0.79 | 0.83 | 70 | 0.3 | 0 |
| COMPARATIVE EXAMPLE 5 | 0.87 | 0.83 | 40 | 1.0 | 0.3 |
| COMPARATIVE EXAMPLE 6 | 0.59 | 0.87 | 75 | 0.7 | 0.6 |
| CONVENTIONAL EXAMPLE 2 | — | — | 46 | 0.6 | 0.7 |
| CONVENTIONAL EXAMPLE 3 | 0.88 | 0.88 | 59 | 0.9 | 0.6 |

| | CYLINDRICAL LITHIUM-ION SECONDARY BATTERY CHARACTERISTICS AFTER RELIABILITY TEST | | | | |
|---|---|---|---|---|---|
| | CAPACITY mAh | CAPACITY DECREASE RATE % | INTERNAL RESISTANCE mΩ | INTERNAL RESISTANCE INCREASE RATE % | SHORT-CIRCUIT FAILURE RATE AFTER RELIABILITY TEST % |
| EXAMPLE 4 | 2435 | 18.8 | 79 | 88.1 | 0.4 |
| EXAMPLE 5 | 2574 | 14.2 | 78 | 73.3 | 0 |
| EXAMPLE 6 | 2475 | 17.5 | 80 | 81.8 | 0 |
| EXAMPLE 7 | 2550 | 15.0 | 79 | 75.6 | 0 |
| EXAMPLE 8 | 2511 | 16.3 | 92 | 76.9 | 0.1 |
| EXAMPLE 9 | 2486 | 17.1 | 100 | 81.8 | 0.2 |
| EXAMPLE 10 | 2450 | 18.3 | 130 | 85.7 | 0.4 |
| COMPARATIVE EXAMPLE 5 | 2425 | 19.2 | 78 | 95.0 | 1.2 |
| COMPARATIVE EXAMPLE 6 | 2385 | 20.5 | 144 | 92.0 | 0.8 |
| CONVENTIONAL EXAMPLE 2 | 2367 | 21.1 | 88 | 91.0 | 0.7 |
| CONVENTIONAL EXAMPLE 3 | 2195 | 26.8 | 120 | 103.4 | 1.2 |

Table 3 shows evaluation results on each separator of Examples 11 to 16, Reference Example 1, Comparative Example 7, and Conventional Examples 4 and 5 described above, and also shows evaluation results on initial characteristics and evaluation results on characteristics after the long-term reliability test of each electric double layer capacitor in those Examples. These are examples of a laminated electric double layer capacitor having a rated voltage of 2.5 V, a rated capacity of 3000 F, a width of 55 mm, a depth of 55 mm, and a height of 155 mm.

TABLE 3

| | SEPARATOR | | | | | |
|---|---|---|---|---|---|---|
| | FIBER TYPE | PROPORTION MASS % | THICKNESS μm | DENSITY g/cm³ | TENSILE STRENGTH N | AIR RESISTANCE SECONDS |
| EXAMPLE 11 | LYOCELL PP | 80 20 | 20 | 0.68 | 45 | 12.8 |

TABLE 3-continued

| | | | | | | |
|---|---|---|---|---|---|---|
| EXAMPLE 12 | LYOCELL | 90 | 30 | 0.40 | 16 | 4.6 |
| | PET | 10 | | | | |
| EXAMPLE 13 | LYOCELL | 75 | 35 | 0.40 | 30 | 5.1 |
| | PET | 25 | | | | |
| EXAMPLE 14 | LYOCELL | 60 | 30 | 0.40 | 15 | 3.7 |
| | PET | 40 | | | | |
| EXAMPLE 15 | LYOCELL | 50 | 30 | 0.40 | 40 | 3.5 |
| | PET | 50 | | | | |
| EXAMPLE 16 | LYOCELL | 75 | 35 | 0.40 | 30 | 5.1 |
| | PET | 25 | | | | |
| REFERENCE EXAMPLE 1 | LYOCELL | 80 | 30 | 0.40 | 45 | 6.2 |
| | PET | 20 | | | | |
| COMPARATIVE EXAMPLE 7 | LYOCELL | 40 | 30 | 0.40 | 25 | 2.9 |
| | PET | 60 | | | | |
| CONVENTIONAL EXAMPLE 4 | LYOCELL | 75 | 30 | 0.40 | 12 | 3.1 |
| | PET | 25 | | | | |
| CONVENTIONAL EXAMPLE 5 | LYOCELL | 100 | 20 | 0.40 | 10 | 4.6 |

| | SEPARATOR CROSS-SECTIONAL STRUCTURE | | LAMINATED ELECTRIC DOUBLE LAYER CAPACITOR INITIAL CHARACTERISTICS | | |
|---|---|---|---|---|---|
| | A/B VALUE OF SYNTHETIC FIBERS | B/A VALUE OF CELLULOSE | INTERNAL RESISTANCE mΩ | SHORT-CIRCUIT FAILURE RATE % | LEAKAGE CURRENT mA |
| EXAMPLE 11 | 0.59 | 0.74 | 0.38 | 0 | 0.3 |
| EXAMPLE 12 | 0.59 | 0.64 | 0.40 | 0 | 0.8 |
| EXAMPLE 13 | 0.59 | 0.73 | 0.45 | 0 | 0.7 |
| EXAMPLE 14 | 0.59 | 0.64 | 0.40 | 0 | 0.9 |
| EXAMPLE 15 | 0.59 | 0.67 | 0.27 | 0.3 | 0.9 |
| EXAMPLE 16 | 0.59 | 0.73 | 0.45 | 0 | 0.7 |
| REFERENCE EXAMPLE 1 | 0.59 | 0.61 | 0.35 | 0 | 0.5 |
| COMPARATIVE EXAMPLE 7 | 0.58 | 0.64 | 0.26 | 0.6 | 1.4 |
| CONVENTIONAL EXAMPLE 4 | 0.88 | 0.88 | 0.40 | 0.8 | 1.4 |
| CONVENTIONAL EXAMPLE 5 | — | 0.65 | 0.30 | 0 | 0.9 |

| | LAMINATED ELECTRIC DOUBLE LAYER CAPACITOR CHARACTERISTICS AFTER RELIABILITY TEST | | | | |
|---|---|---|---|---|---|
| | CAPACITY F | CAPACITY DECREASE RATE % | INTERNAL RESISTANCE mΩ | INTERNAL RESISTANCE INCREASE RATE % | SHORT-CIRCUIT FAILURE RATE AFTER RELIABILITY TEST % |
| EXAMPLE 11 | 2550 | 15.0 | 0.70 | 84.2 | 0 |
| EXAMPLE 12 | 2500 | 16.7 | 0.70 | 75.0 | 0.3 |
| EXAMPLE 13 | 2600 | 13.3 | 0.75 | 66.7 | 0 |
| EXAMPLE 14 | 2650 | 11.7 | 0.67 | 67.5 | 0.2 |
| EXAMPLE 15 | 2490 | 17.0 | 0.50 | 85.2 | 0.4 |
| EXAMPLE 16 | 2409 | 19.7 | 0.88 | 95.0 | 0.3 |
| REFERENCE EXAMPLE 1 | 2750 | 8.3 | 0.60 | 71.4 | 0 |
| COMPARATIVE EXAMPLE 7 | 2480 | 17.3 | 0.50 | 92.3 | 0.7 |
| CONVENTIONAL EXAMPLE 4 | 2350 | 21.7 | 0.85 | 112.5 | 1.1 |
| CONVENTIONAL EXAMPLE 5 | 2250 | 25.0 | 0.67 | 123.3 | 1.1 |

Hereinafter, the evaluation results on Examples, Comparative Examples, and Conventional Examples will be described in detail.

The lithium-ion secondary batteries prepared with the separators of Examples 1 to 3 are excellent, causing no short-circuit failures. In regard to the internal resistance and the internal resistance increase rate after the long-term reliability test, values are lower than those in Conventional Examples and are sufficiently small. The capacity decrease rate after the long-term reliability test is also within 20% from the initial state, causing no problem. The short-circuit failures due to the overcharge test and the short-circuit failures after long-term reliability test are not generated, indicating that the lithium-ion secondary batteries prepared with the separators of Examples 1 to 3 achieve positive results.

The regenerated cellulose fibers used in Example 1 and Example 3 are different from those in Example 2. These examples show that any type of regenerated cellulose fiber is employable.

The separators of Comparative Example 1 and Comparative Example 2 are those prepared in a manner similar to the separator of Example 1 except that the thickness and density are different. In the lithium-ion secondary batteries of Comparative Example 1 and Comparative Example 2, the short-circuit failure rate and the short-circuit failure rate after the long-term reliability test are both 0.5% or more, which is high. This result shows that it is preferable that a separator has a thickness of 10 μm or more and a density of 0.25 g/cm³ or more.

In the lithium-ion secondary battery of Comparative Example 3, the short-circuit failure rate, the overcharge test failure rate, and the short-circuit failure rate after the reliability test all far exceed 1%. A possible reason is that the separator of Comparative Example 3 includes the cellulose fibers and the synthetic fibers being homogeneously entwined with each other and has the air resistance much lower than that in Examples 1 to 3, causing a poor shielding performance.

The separator of Comparative Example 4 is prepared in a manner similar to the separator of Example 3 except that the thickness and density are different. The lithium-ion secondary battery of Comparative Example 4 has the internal resistance and the internal resistance increase rate higher than those in Example 3. This result shows that it is preferable that a separator has a thickness of 70 μm or less, a density of 0.90 g/cm³ or less, and an air resistance of 80 seconds or less.

In the lithium-ion secondary batteries prepared with the separators of Examples 4 to 10, the short-circuit failure rate, the overcharge test failure rate, and the short-circuit failure rate after the long-term reliability test are all 0.5% or less, which is sufficiently low. The initial internal resistance is 70 mΩ or less, which is sufficiently small. The internal resistance increase rate after the long-term reliability test has a growth rate of 90% or less, which is no problem. The capacity decrease rate after the long-term reliability test is also within 20% from the initial state, causing no problem.

The separators in Example 6 and Example 7 are those subjected to thermal calendaring after sheet formation. The separator of Example 6 has a thickness of 15 μm and the same tensile strength as Example 8 that has a thickness of 40 μm. The separator of Example 7 has a thickness of 20 μm but is superior in tensile strength to the separator of Example 10 that has a thickness of 60 μm. This result shows that calendaring that applies more pressure than heating and compression in a drying process by a paper machine strongly fuses and compressively bonds the thermoplastic synthetic fibers to each other, leading to further improvement in separator strength.

Furthermore, the separator of Example 7 is superior in tensile strength to the separator of Conventional Example 1 which is a film composed of polyethylene resin. Although details are unknown, a possible reason is as follows.

Since the separator of Conventional Example 1 is a film, pulling the separator causes the separator to stretch. Therefore, pores formed inside the film and on the film surface are elongated, deformed, and split. Alternatively, the stretch of the film causes a locally thinned part. In the locally thinned part, the mechanical strength is deteriorated, causing a fracture starting from that part. On the other hand, in the separator of Example 7, the synthetic resin fibers are fused and compressively bonded to each other, and the regenerated cellulose fills the periphery thereof. Therefore, when being pulled, the separator stretches to a small extent. Accordingly, the separator of Example 7 is considered to have an improved tensile strength.

In the separator of Comparative Example 5, the CSF value is 150 ml on the decreasing side, and the separator has a fiber length over 2 mm. Therefore, the separator has an A/B value over 0.85. A difference between the A/B value of the separator of Comparative Example 5 and that of the separator of Conventional Example 3 is small. This result indicates that the separator of Comparative Example 5 does not have the structure of unevenly distributed fibers according to the present invention and has a weak tensile strength.

The separator of Comparative Example 5 is prepared in a manner similar to the separator of Example 4. However, in the lithium-ion secondary battery including the separator of Comparative Example 5, the short-circuit failure rate and the short-circuit failure rate after the long-term reliability test are both 1% or more. This is because the A/B value exceeds 0.85, and the fusion and compressive bonding between the thermoplastic synthetic fibers are insufficient.

In the separator of Comparative Example 6, the CSF value is 750 ml on the increasing side, and the separator has a fiber length of less than 0.2 mm. The A/B value is 0.85 or less, but the B/A value is over 0.85. Therefore, compared with the lithium-ion secondary batteries of Examples 4 to 10, the separator of Comparative Example 6 increases in both the short-circuit failure rate and the short-circuit failure rate after the long-term reliability test.

These results show that it is preferable that a separator has an A/B value of 0.85 or less and a B/A value of 0.85 or less.

In order to achieve these values, it is clear that beaten regenerated cellulose fibers preferably have a mean fiber length of 0.2 to 2.0 mm, a CSF value of 100 to 0 ml on the decreasing side and a CSF value of 700 ml or less on the increasing side.

In Examples 4 and 10, the A/B value is 0.85 or less and over 0.75. On the other hand, in Examples 5 to 9, the A/B value is 0.75 or less. Therefore, the lithium-ion secondary batteries including the separators of Examples 5 to 9 have a lower short-circuit failure rate than the lithium-ion secondary batteries including the separators of Example 4 and Example 10. This result shows that it is preferable that a separator has an A/B value of 0.75 or less. In order to achieve an A/B value of 0.75 or less, it is clear that beaten regenerated cellulose fibers preferably have a mean fiber length of 0.4 to 1.0 mm.

In Examples 8 and 9, the A/B value is 0.75 or less and over 0.6. On the other hand, in Examples 5 to 7, the A/B value is 0.59. Therefore, the lithium-ion secondary batteries including the separators of Examples 5 to 7 have a lower short-circuit failure rate than the lithium-ion secondary batteries including the separators of Example 8 and Example 9. This result shows that it is more preferable that a separator has an A/B value of 0.6 or less. In order to achieve an A/B value of 0.6 or less, it is clear that beaten regenerated cellulose fibers preferably have a mean fiber length of 0.5 to 1.0 mm.

The separator of Conventional Example 2 includes a Tanmo/cylinder double layer prepared with a raw material similar to that in Example 5, and the separator is of a type similar to the separator disclosed in Patent Literature 4 and Patent Literature 5. The separator of Conventional Example 2 is thicker and has a higher density than the separator of Example 5. However, the short-circuit failure rate and the overcharge test failure rate of the lithium-ion secondary battery of Conventional Example 2 are higher than those in Example 5. This is because approximately half of the separator is occupied by a cylinder layer having a low shielding performance. When the thickness or the density of the separator is increased in order to reduce the short-circuit failure rate, the internal resistance also increases. This result shows that the separator of the present invention, which is formed into a single layer in an integrated manner and has unevenly distributed fibers in the layer, is superior in shielding performance to a separator including two sheets that are superposed simply, and has a satisfactory shielding performance even though the thickness is made thin.

The overcharge test failure rates of each Example and Conventional Example 2 show that a separator having a structure of unevenly distributed fibers and having an air resistance of 3.5 seconds or more is a separator excellent in shielding performance.

The separator of Conventional Example 3 is prepared based on Patent Literature 1. Since this separator has a homogeneous cross-sectional structure, the short-circuit failure rate, the short-circuit failure rate after the long-term reliability test, and the overcharge test failure rate are high.

In the electric double layer capacitors prepared with the separators of Examples 11 to 16, the short-circuit failure rate and the short-circuit failure rate after the long-term reliability test are both 0.5% or less, which is sufficiently low. The initial internal resistance and the leakage current are also sufficiently low. The internal resistance increase rate after the long-term reliability test is lower than that in Conventional Examples and is sufficiently small. Furthermore, the capacity decrease rate after the long-term reliability test is also within 20%, which causes no problem.

Example 11 uses a separator similar to Example 7, indicating that a separator included in a lithium-ion secondary battery is also applicable to an electric double layer capacitor.

Example 12 is a separator containing 90 mass % of regenerated cellulose fibers. When the proportion of the thermoplastic synthetic fibers is reduced from this range, the tensile strength is not expected to be improved as compared with that of the separators of Conventional Examples.

In Example 14, the thermoplastic synthetic fibers have a fiber diameter of 10 μm. When the fiber diameter of the thermoplastic synthetic fibers is made larger than this value, similarly to the case where the proportion of the thermoplastic synthetic fibers is made too small, the tensile strength is not expected to be improved as compared with that of the separators of Conventional Examples.

Example 15 is a separator containing 50 mass % of regenerated cellulose fibers. When the proportion of the regenerated cellulose fibers is reduced from this range, the short-circuit failure rate is not expected to be reduced.

The separators of Example 13 and Example 16 are electric double layer capacitors similar to each other except for a direction in which each separator is arranged. Comparing the capacity decrease rate and the internal resistance increase rate between Example 13 and Example 16, Example 13 achieves better results. This is because, in Example 13, the B part of the separator is disposed on the positive electrode of the electric double layer capacitor, and a resistance to acidic conditions around the positive electrode is stronger than that in the separator of Example 16.

As synthetic fibers, Reference Example 1 uses synthetic fibers having a fiber diameter of 0.1 μm. Performances of the separator and the electric double layer capacitor are satisfactory, but the synthetic fibers tend to float easily during the manufacturing process of the separator (a step of stocking before supplying the fibers onto a wire), which reduces the productivity of the separator.

Comparative Example 7 is a separator containing 40 mass % of regenerated cellulose fibers. The separator has a low shielding performance, which increases the short-circuit failures in the electric double layer capacitor. Comparison between Comparative Example 7 and Example 15 shows that a proportion of regenerated cellulose fibers is preferably 50 mass % or more.

Conventional Example 4 uses a separator similar to Conventional Example 3. Therefore, similarly to the lithium-ion secondary battery of Conventional Example 3, the electric double layer capacitor of Conventional Example 4 has a high short-circuit failure rate and a high short-circuit failure rate after the long-term reliability test. The leakage current is also high.

The separator of Conventional Example 5 is prepared based on Patent Literature 2. Since this separator is composed of regenerated cellulose fibers, having a significantly high shielding performance, it causes no short-circuit failures. However, this separator has a low tensile strength. Therefore, it is difficult to treat the separator during the manufacturing process of the electric double layer capacitor, which reduces the productivity of the electric double layer capacitor. Furthermore, since the separator is composed of regenerated cellulose fibers, it causes significant deterioration in various performances after the long-term reliability test.

In any of Examples, the separator according to this embodiment shows good results on the long-term reliability test. Therefore, the separator according to this embodiment is satisfactorily applied to an electrochemical element that operates in environments harsher than those illustrated in this embodiment, for example, high voltages and high temperatures.

The separator according to this embodiment has been illustrated as being included in a lithium-ion secondary battery and an electric double layer capacitor.

In regard to details on other configurations and manufacturing methods of a lithium-ion secondary battery and an electric double layer capacitor, they are not described in this description.

In a lithium-ion secondary battery and an electric double layer capacitor according to the electrochemical element of the present invention, electrode materials, electrolytic solution materials, and other members or the like are not particularly limited, and various materials are employable.

The separator for an electrochemical element of the present invention is also applicable to an electrochemical element other than one described in this embodiment, for example, an electrochemical element such as a lithium-ion capacitor, an aluminum electrolytic capacitor, and a lithium-ion primary battery.

REFERENCE SIGNS LIST

10 separator for electrochemical element
10A A part
10B B part
11 stems of regenerated cellulose fibers
12 thermoplastic synthetic fibers
13 fibrils of regenerated cellulose fibers
20, 30, 50 automobile
21, 52 lithium-ion secondary battery
22, 56, 57 motor
23, 35, 53 brake 24, 54 charger
25, 55 external power source
26, 60 battery control ECU
27, 63 motor control ECU
28, 64 EPS control ECU
29, 41, 62 regenerative braking control ECU
31, 51 engine
32 accelerator
33 transmission
34 regeneration unit
36 ABS unit
37 air condition
38, 58 fuel injection ECU
39, 59 electronic throttle ECU
40 transmission ECU
42 ABS ECU
61 HEV system control ECU
70, 80 electronic device
71 power source
72 load (such as LED)
73, 83 electric double layer capacitor
81 lithium-ion secondary battery or the like
82 load

The invention claimed is:

1. A separator for an electrochemical element, the separator being interposed between a pair of electrodes and configured to be capable of holding an organic electrolytic solution that contains an electrolyte,
wherein the separator is a wet-laid nonwoven fabric that contains 10 to 50 mass % of thermoplastic synthetic fibers and 50 to 90 mass % of beaten regenerated cellulose fibers having a mean fiber length of 0.2 to 2.0 mm, and the separator has a thickness of 10 to 70 μm and a density of 0.25 to 0.90 g/cm$^3$, including two parts obtained by bisecting a cross-section of the separator in a thickness direction,
wherein the two parts are a part (A part) with a small number of the thermoplastic synthetic fibers and a part (B part) with a large number of the thermoplastic synthetic fibers, and the A part and the B part are formed into a single layer in an integrated manner,
wherein a value obtained by dividing the number of the thermoplastic synthetic fibers in the A part by the number of the thermoplastic synthetic fibers in the B part is 0.85 or less.

2. The separator for an electrochemical element according to claim 1, wherein the thermoplastic synthetic fibers are one or more kinds of fibers selected from a polyester fiber, a polyolefin fiber, and an acrylic fiber.

3. The separator for an electrochemical element according to claim 1, wherein a value obtained by dividing the number of the regenerated cellulose fibers in the B part by the number of the regenerated cellulose fibers in the A part is 0.85 or less.

4. An electrochemical element including the separator for an electrochemical element according to claim 1.

5. The electrochemical element according to claim 4, wherein the electrochemical element is any one of an aluminum electrolytic capacitor, an electric double layer capacitor, a lithium-ion capacitor, a lithium-ion secondary battery, and a lithium primary battery.

6. The electrochemical element according to claim 5, wherein the part (B part) in the separator for an electrochemical element that has a large number of the thermoplastic synthetic fibers is disposed on a positive electrode of the electrochemical element.

7. An electronic device equipped with the electrochemical element according to claim 4.

8. An automobile equipped with the electrochemical element according to claim 4.

* * * * *